United States Patent
Fujiwara et al.

(10) Patent No.: US 6,841,114 B2
(45) Date of Patent: Jan. 11, 2005

(54) MOLDING METHOD AND APPARATUS FOR RESIN LONG BODY

(75) Inventors: Satoru Fujiwara, Arida (JP); Akihiro Yamamoto, Arida (JP); Atsushi Ohhori, Arida (JP)

(73) Assignee: Mitsubishi Cable Industries, Ltd., Amagasaki (JP)

(*) Notice: Subject to any disclaimer, the term of this patent is extended or adjusted under 35 U.S.C. 154(b) by 0 days.

(21) Appl. No.: 10/101,975

(22) Filed: Mar. 21, 2002

(65) Prior Publication Data

US 2002/0190430 A1 Dec. 19, 2002

(30) Foreign Application Priority Data

| Mar. 28, 2001 | (JP) | 2001-092175 |
| Mar. 28, 2001 | (JP) | 2001-092176 |
| Nov. 14, 2001 | (JP) | 2001-348520 |
| Jan. 16, 2002 | (JP) | 2002-006966 |
| Jan. 30, 2002 | (JP) | 2002-021389 |

(51) Int. Cl.[7] ............................................. B29C 45/30
(52) U.S. Cl. ................. 264/328.12; 264/327; 264/334; 425/547; 425/557
(58) Field of Search ........................... 264/328.12, 327, 264/336, 334, 299, 319, 271.1, 161, 328.7, 328.9, 171.1; 425/557, 547, 542, 573, 556, 552

(56) References Cited

U.S. PATENT DOCUMENTS

| 2,624,071 A | * | 1/1953 | Strahm et al. ............... 425/547 |
| 4,005,166 A | * | 1/1977 | Quick ........................ 264/154 |
| 4,404,159 A | * | 9/1983 | McFarlane ................... 264/296 |
| 4,466,934 A | * | 8/1984 | Cane et al. .................. 264/106 |
| 4,752,199 A | * | 6/1988 | Arai ............................ 425/130 |
| 4,942,010 A | * | 7/1990 | Baker ..................... 264/328.12 |
| 4,963,312 A | * | 10/1990 | Muller ........................ 264/327 |
| 5,330,693 A | * | 7/1994 | Takada ........................ 264/106 |
| 5,409,654 A | * | 4/1995 | Platusich ..................... 264/161 |
| 5,759,647 A | * | 6/1998 | Kuroda et al. ............. 428/34.5 |
| 6,048,485 A | * | 4/2000 | Field et al. ................. 264/322 |
| 6,394,779 B1 | * | 5/2002 | Komazawa et al. ......... 425/123 |

* cited by examiner

Primary Examiner—Michael P. Colaianni
Assistant Examiner—Monica A. Fontaine
(74) Attorney, Agent, or Firm—Armstrong, Kratz, Quintos, Hanson & Brooks, LLP

(57) ABSTRACT

A molding method for resin long body to make a thin long body of resin. Molten resin is supplied to a spaced portion of a mold through a thin film gate after a resin well of enlarged hollow ring is filled with the molten resin through plural pin runners in advance.

21 Claims, 32 Drawing Sheets

A-A

Fig. 24
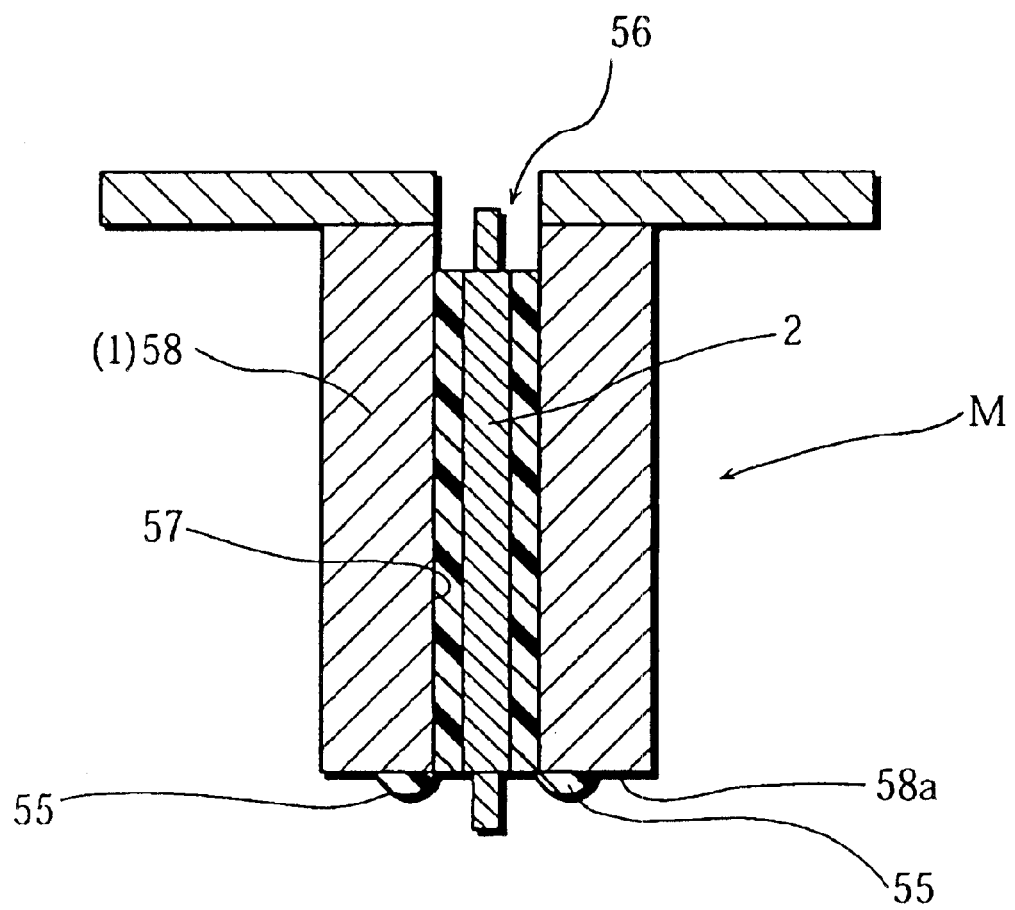
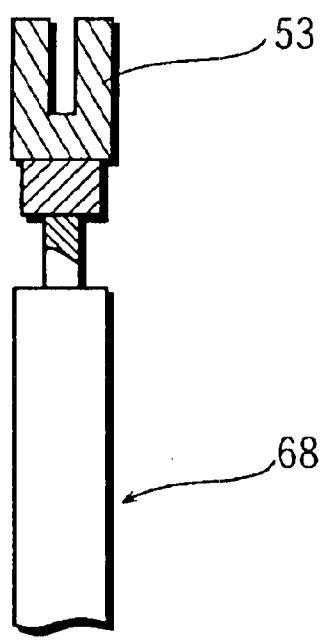

MOLDING METHOD AND APPARATUS FOR RESIN LONG BODY

BACKGROUND OF THE INVENTION

1. Field of the Invention

This invention relates to a molding method and a molding apparatus for a resin long body.

2. Description of the Related Art

Conventionally, for manufacturing a hollow long body with molten resin by injection mold, a molding method and apparatus, in which a multipoint pin gate or a film gate is provided on an end portion of a mold having a shaft inside and heat plastic molten resin is supplied to an inner portion of the mold, are widely used.

Or, molding of the resin long body is, as shown in FIG. 33, conducted as that plural resin injection holes 47 are provided along a longitudinal direction of a mold 41 (longitudinal direction of the long body), and molten resin 43 is injected to a cavity of the mold 41 through the plural injection holes 47. Or, in a case that the molten resin 43 is injected from an injection hole 47 on an end side of the mold 41 as shown in FIG. 34, the injection of the molten resin 43 is conducted with keeping the temperature of the whole mold 41 constant.

As shown in FIG. 32, flowing speed of the molten resin 43 supplied to the inner portion of the mold 41 becomes irregular in the mold 41 by the disposition of a gate 44 and supplying balance of the molten resin. In this case, on a part that the molten resin 43 goes farther, as shown with two-dot broken lines in FIG. 32, a shaft 42 is formed bent by pressure of the molten resin 43, and molded product curves in an opposite direction because the bent shaft 42 rebounds when the molded product is taken out of the mold.

And, as the molded product, rollers used for OA appliances such as a copy machine, a printer, etc. which are tending to correspond to high-speed processing and large-size paper, are required to be long and highly accurate. In a case that the long body as the product is long and thin as described above, injection pressure of the molten resin 43 becomes high because passage for the molten resin 43 in the mold 41 becomes narrow and flowing resistance of the molten resin 43 is high, and the deformation of the shaft 42 is promoted thereby.

Further, in the conventional method shown in FIG. 33, molded product with good dimensional accuracy is not obtained because velocity distribution and confluence are generated in the injected molten resin 43. And, in a case that the molded product has the shaft 42, the shaft 42 is bent by the injection pressure of the molten resin 43, great curvature is generated in the molded product 45 after the resin is solidified (taken out of the mold 41) as shown in FIG. 35, and the product becomes defective with great core deviation.

And, in the conventional method shown in FIG. 34, especially in a case of molding a thin product with small cross-sectional area, a thin long body can not be molded because flowing of the resin stops when the resin solidifies before the cavity is filled. In this conventional method, when the thickness (wall thickness when the product is a pipe) t and the length L are in the relationship of $L/t \geq 100$, it is quite difficult to mold the product with high accuracy.

And, when the mold is conducted with the mold 41 of which temperature is kept higher than the melting point of the resin, although the resin is filled to the downstream side in the longitudinal direction of the mold, a recess (concave) 46 is generated on the molded product 45 as shown in FIG. 36 when the resin is cooled and shrunk because of the high temperature of the mold, and the product becomes defective thereby.

And, in the injection mold with the mold 41 shown in FIG. 37, the resin body 48 solidified in the film gate (runner portion) 44 is cut and removed in a separated cutting process by cutting the gate (runner) along the circumference of the resin body 48 with a cutting blade after the molded product 45 is taken out of the mold 41. That is to say, it is difficult to cut the gate effectively in the molding cycle of serial injection moldings.

It is therefore an object of the present invention to provide a molding method and a molding apparatus for resin long body with which a thin long body of resin can be made and molded with high accuracy with excellent productivity.

BRIEF DESCRIPTION OF THE DRAWINGS

The present invention will be described with reference to the accompanying drawings in which:

FIG. 24 is a cross-sectional side view of the mold for explanation of gate cutting process;

DESCRIPTION OF THE PREFERRED EMBODIMENTS

Preferred embodiments of the present invention will now be described with reference to the accompanying drawings.

Figure 1:
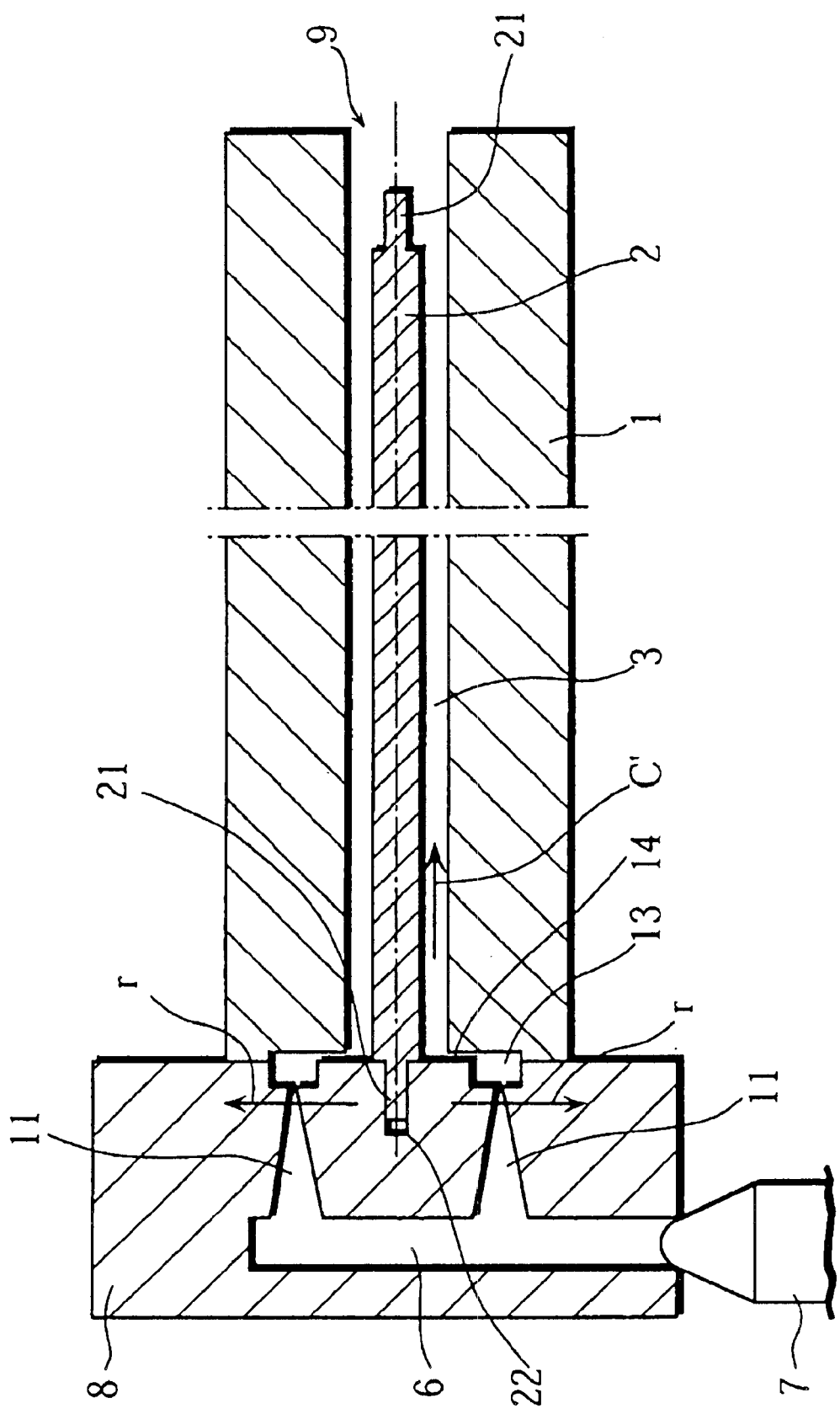
FIG. 1 is a cross-sectional side view showing an embodiment of a molding apparatus of the present invention.

FIG. 1 shows an embodiment of a molding apparatus for a resin long body relating to the present invention. This molding apparatus is composed of a mold 1 for injection molding can be disposed around a shaft 2 as a center, main body 8 of molten resin supplying passage, and a molten resin injection molding machine 7. The mold 1 has a round hole 9 for molding a long body, and a spaced portion 3 of ring, i.e. a cavity, is formed in the mold 1 by providing the shaft 2 to be inserted to the center of the round hole 9. The mold 1 and the shaft 2 are detachably fixed to the supplying passage main body 8 to which the injection molding machine 7 is connected. And, FIG. 2 shows another embodiment of the invention, namely a molding apparatus for a resin long body in which the spaced portion 3 (mold 1) of ring is disposed in a longitudinal direction vertically, and the supplying passage main body 8 is disposed on a lower end side of the spaced portion 3.

Figure 7:
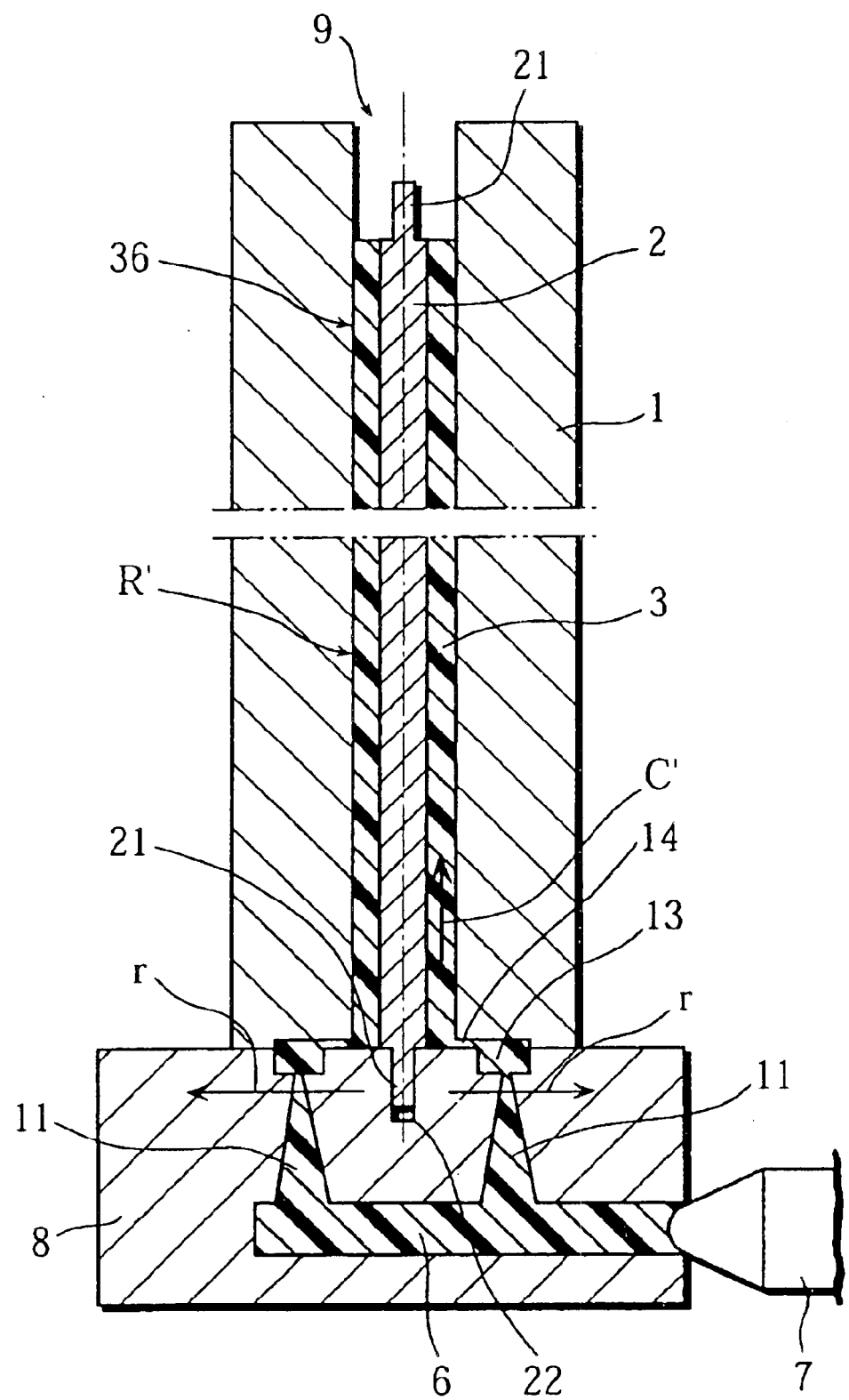
FIG. 7 is a cross-sectional side view of the molding apparatus showing a molded state.

And, in the molding apparatus of the present invention, heat plastic molten resin R is injected and filled to the spaced portion 3, cooled and solidified, and a roller 36 is obtained with the shaft 2 (refer to FIG. 7). That is to say, the roller 36 is made by covering the periphery of the metal shaft 2 with the molten resin R by injection mold. The shaft 2 has a protruding shaft 21 on the both ends, the protruding shaft 21 fits to a holding hole 22 on the supplying passage main body 8 to hold the shaft 2. And, the shaft 2 is corresponding to one of parts serially supplied to the mold 1 because the molded product (roller 36) obtained by covering the shaft 2 with the molten resin R is serially taken out of the mold 1.

And, the roller 36, made by the molding apparatus of the present invention, is used for OA appliances such as a copy machine, a printer, etc. which currently apt to correspond to high speed processing and large-sized paper. So especially long and accurate rollers are required.

Figure 2:
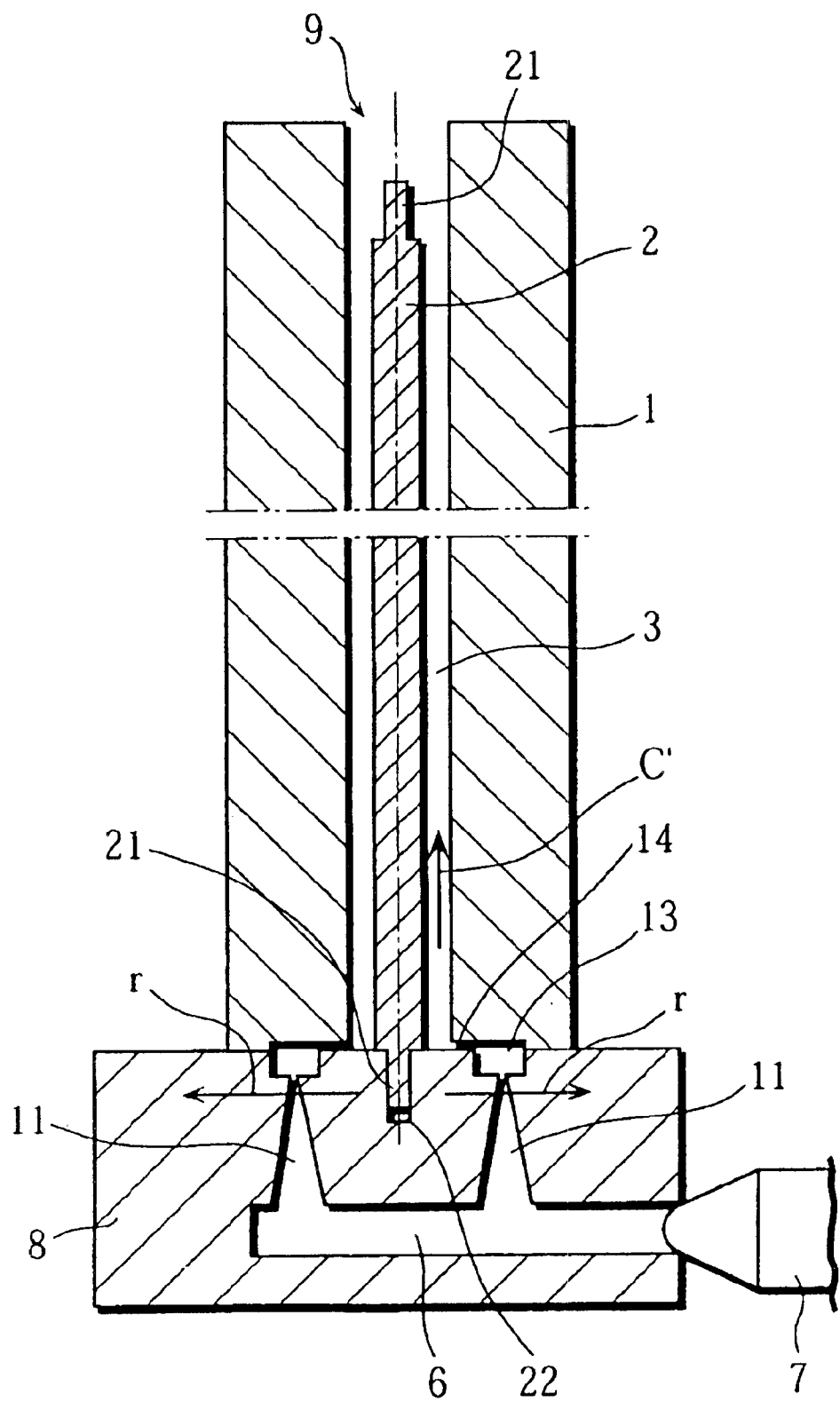
FIG. 2 is a cross-sectional side view showing another embodiment of the molding apparatus of the present invention.

And, as shown in FIG. 1 and FIG. 2, a film gate 14 of plane ring in radial directions r of the spaced portion 3 is connected to an end portion (lower end portion in FIG. 2) of the spaced portion 3 of the mold 1 in an axis direction C. A resin well 13 having a configuration of an enlarged hollow ring in cross section is connected to another end (outer end) side of the film gate 14. The resin well 13 has a space in the axis direction C and the radial directions r of the spaced portion 3, and forms a short cylinder, and, plural pin runners 11 (pin-shaped sprues) are disposed in the resin well 13 in the axis direction C described above. And, connection position of the pin runner 11 (with the resin well 13) is preferably on a position apart from the film gate 14 connected to the resin well 13.

Figure 3:
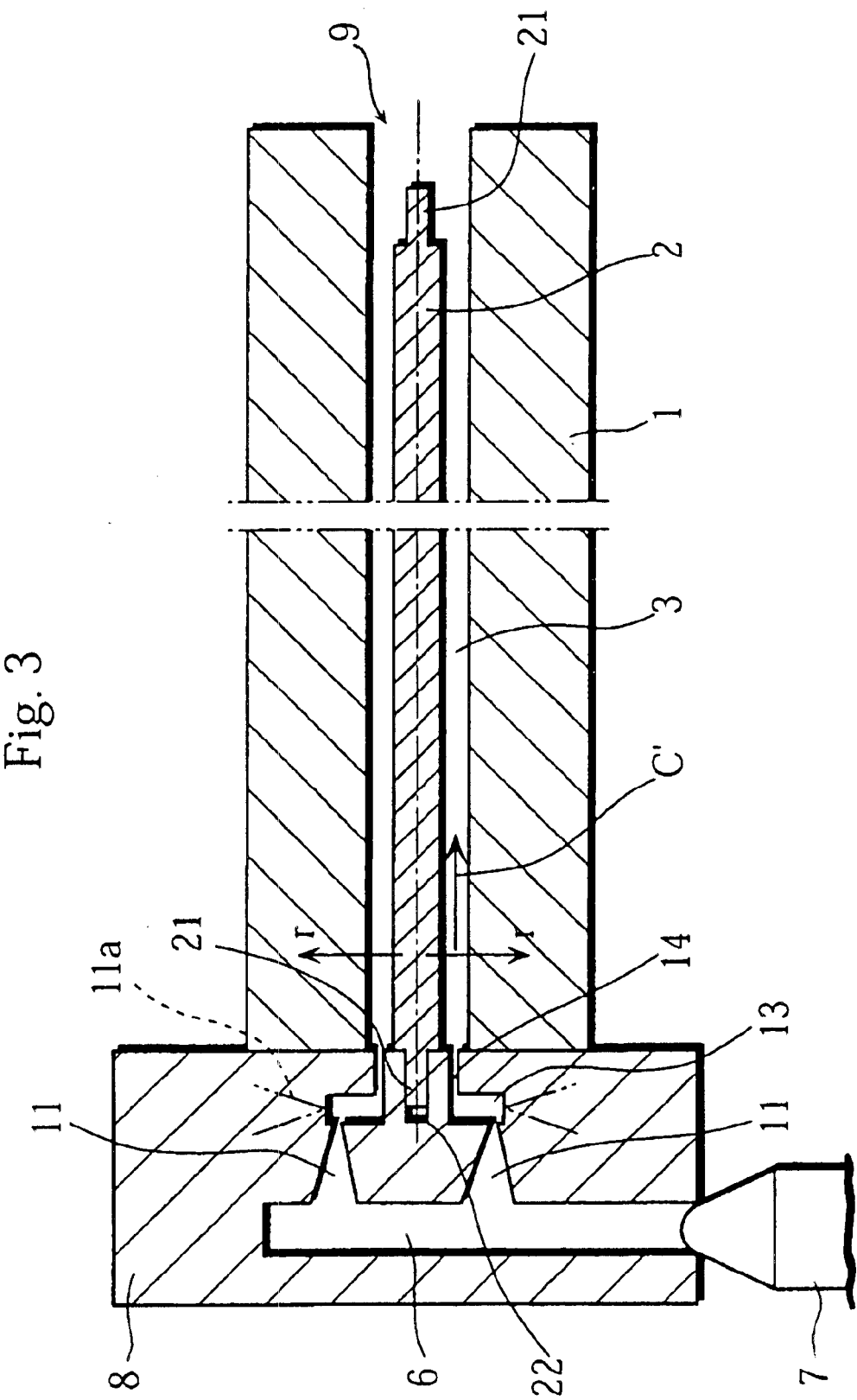
FIG. 3 is a cross-sectional side view showing still another embodiment of the molding apparatus of the present invention.

And, FIG. 3 shows still another embodiment of the present invention. Similar to the molding apparatus of FIG. 1, this molding apparatus is composed of a mold 1 for injection molding can be disposed around a shaft 2 as a center, main body 8 of molten resin supplying passage, and a molten resin injection molding machine 7. The mold 1 has a round hole 9 for molding a long body, and a spaced portion 3 of ring, i.e. a cavity, is formed in the mold 1 by providing a shaft 2 to be inserted to the center of the round hole 9. The mold 1 and the shaft 2 are detachably fixed to the supplying passage main body 8 to which the injection molding machine 7 is connected. And, FIG. 4 shows further embodiment of the invention, namely a molding apparatus for a resin long body in which the spaced portion 3 (mold 1) shown in FIG. 3 is disposed in a longitudinal direction vertically.

Figure 4:
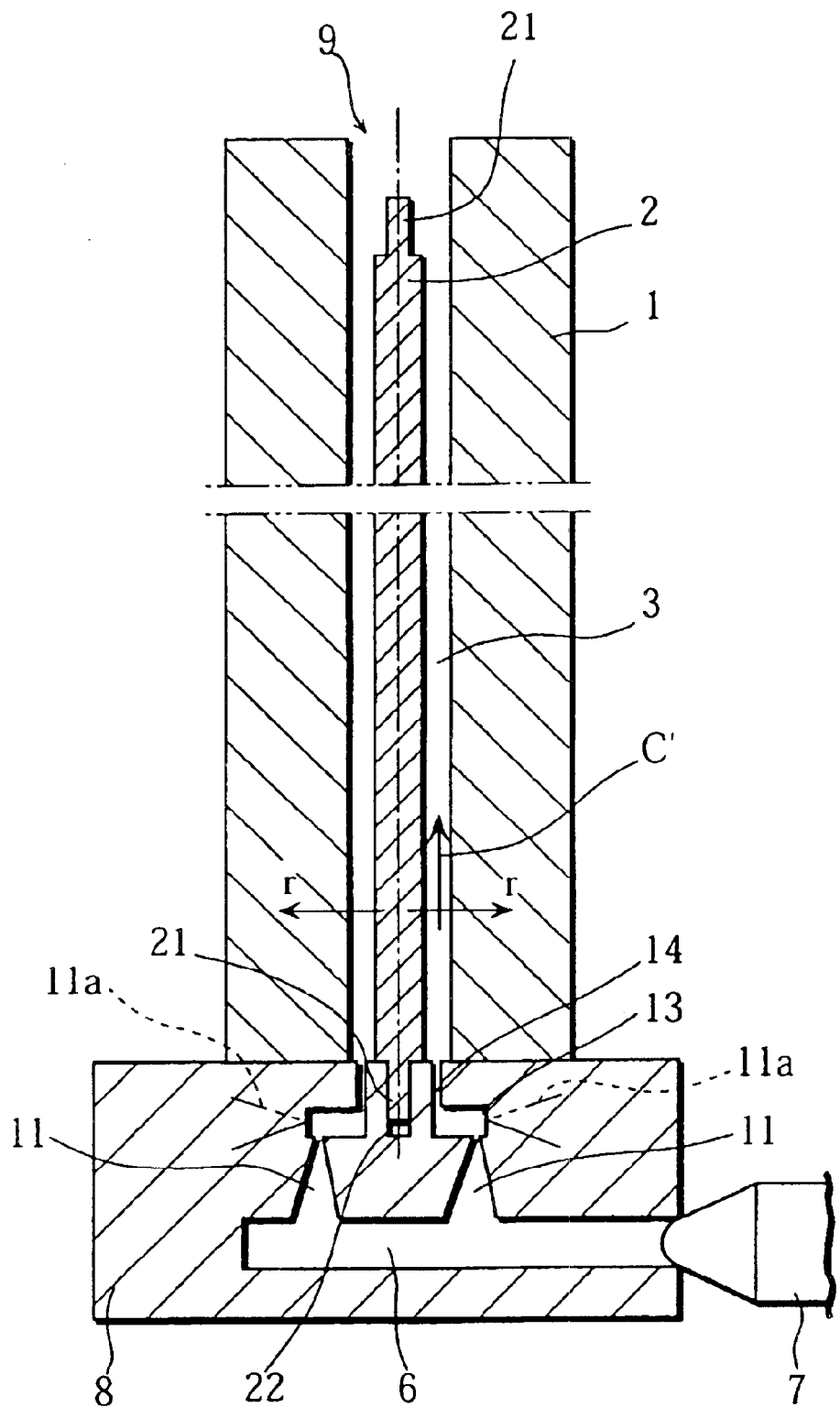
FIG. 4 is a cross-sectional side view showing further embodiment of the molding apparatus of the present invention.

And, as shown in FIG. 3 and FIG. 4, a film gate 14 of plane ring is connected to an end portion (lower end portion in FIG. 4) of the spaced portion 3 of the mold 1 in an axis direction C'. A resin well 13 having a configuration of an enlarged hollow ring in cross section is connected to another end (outer end) side of the film gate 14. The resin well 13 has a space in the axis direction C' and the radial directions r of the spaced portion 3, and forms a short ring cylinder. And, the film gate 14 is connected to an inner peripheral side of the ring of the resin well 13 of short ring cylinder. And, plural pin runners 11 are disposed in the resin well 13 on a peripheral side of the ring of the resin well 13 of short ring cylinder and in the axis direction C' of the spaced portion 3 of the mold 1. Or, as shown with two-dot broken lines in FIG. 3 and FIG. 4, plural pin runners 11a may be connected to the peripheral face of the ring of the resin well 13 of short ring cylinder. That is to say, the plural pin runners 11a may be connected to the peripheral face of the resin well 13 in the radial directions r of the spaced portion 3.

And, the film gate 14 may be not only disposed in the radial directions r or the axis direction C' of the spaced portion 3 (at right angles with or parallel to the axis), but at random directions with the spaced portion 3. That is to say, configuration of the film gate 14 may be a frustum with thin shell. And, although the direction (inclination) of the pin runner 11 is freely chosen, it is desirable that an extension line of an exit of the pin runner 11 avoids the film gate 14.

Figure 5A:
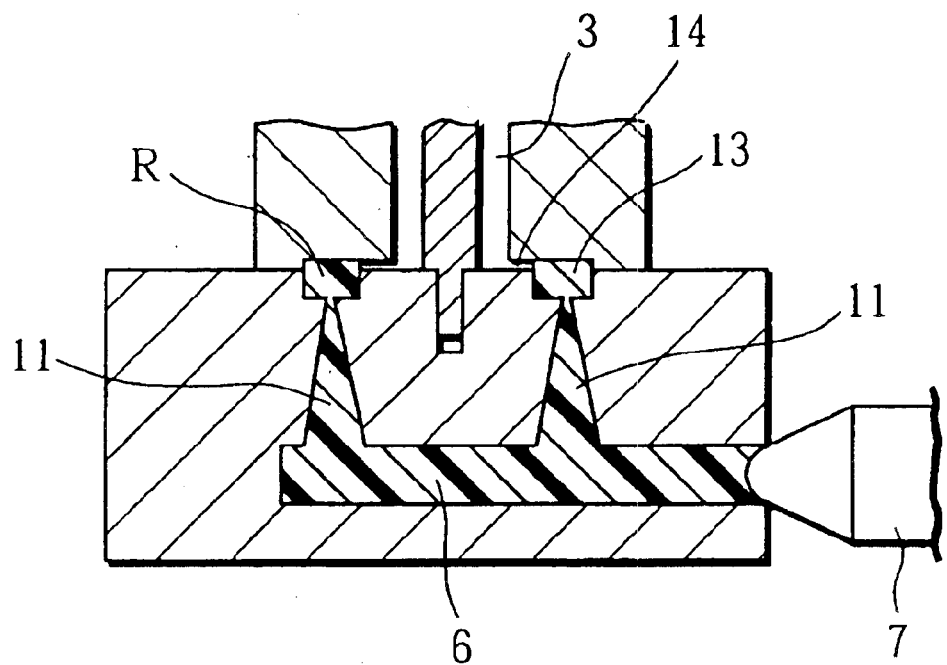
FIG. 5 is a cross-section of a principal portion of the molding apparatus showing a molding state.
Figure 5B:
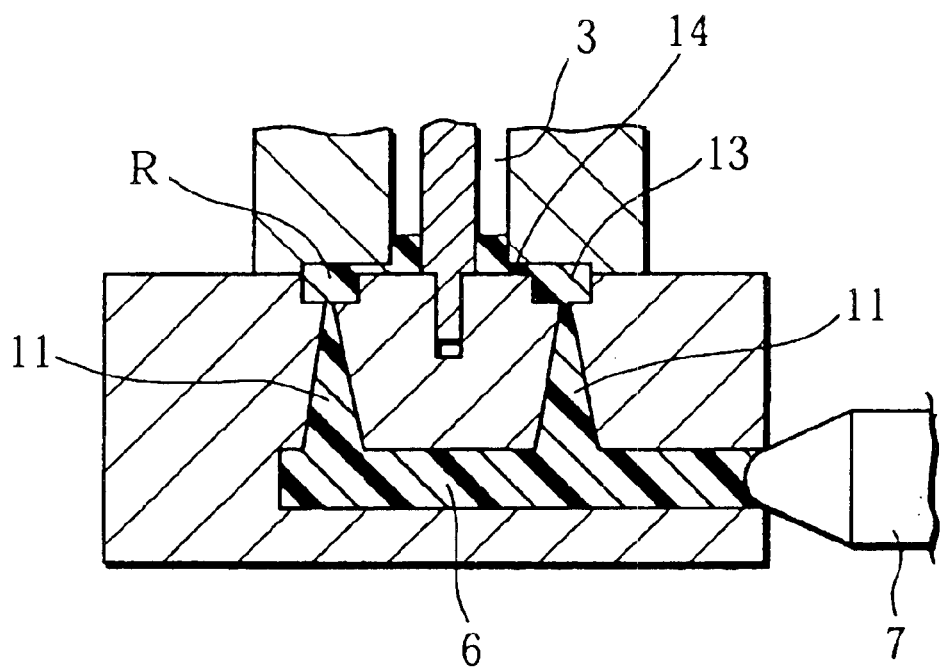

Next, molding method for resin long body with the molding apparatus shown in FIG. 2 is described. The molten resin supplied from a nozzle of the injection molding machine 7 is serially sent to a supplying passage and the plural pin runners 11, and flowing into the resin well 13 having the configuration of an enlarged hollow ring in cross section. Then, as shown in FIG. 5A, the molten resin R, once filled the resin well 13, is immediately pressed into the film gate 14, and sent out to the spaced portion 3 as shown in FIG. 5B.

Figure 6A:
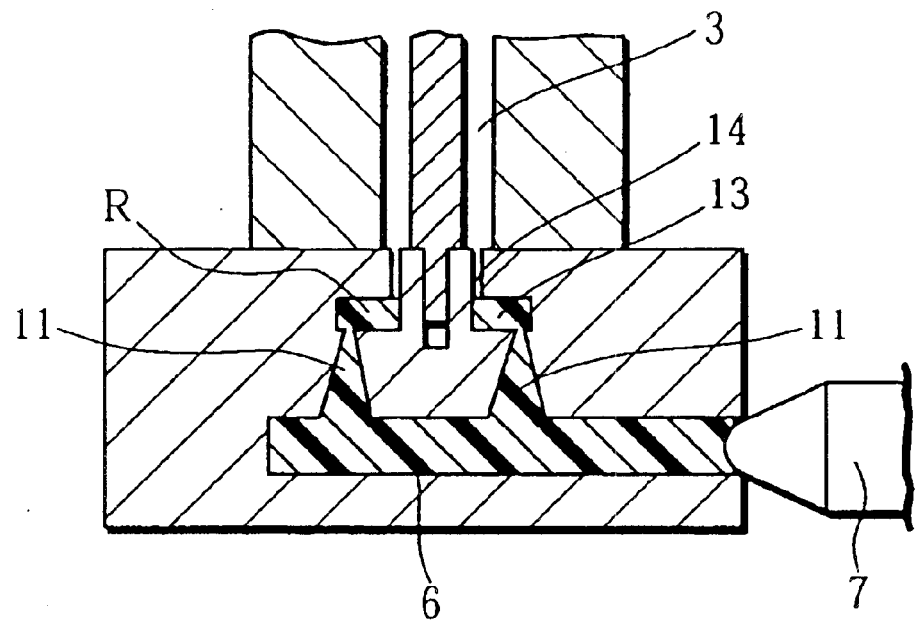
FIG. 6 is a cross-section of a principal portion of the molding apparatus showing a molding state.
Figure 6B:
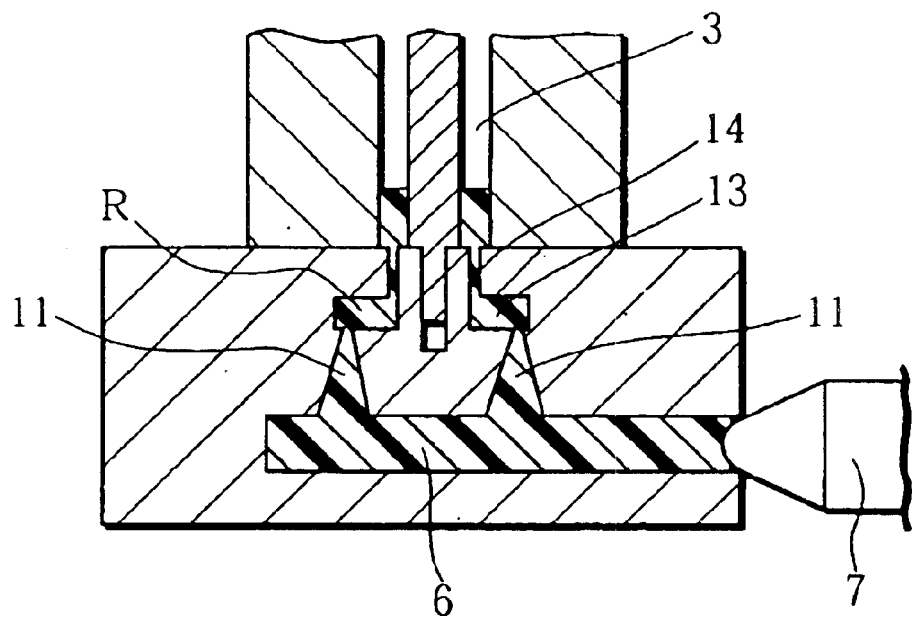

Next, molding method for resin long body with the molding apparatus shown in FIG. 4 is described. The molten resin supplied from a nozzle of the injection molding machine 7 is serially sent to a supplying passage and the plural pin runners 11, and flowing into the resin well 13 having the configuration of an enlarged hollow ring in cross section. Then, as shown in FIG. 5A, the molten resin R, once filled the resin well 13, is immediately pressed into the film gate 14, and sent out to the spaced portion 3 as shown in FIG. 6B.

That is to say, in the present molding method, the resin well 13 and the spaced portion 3 are successively filled with the molten resin at the same time.

In FIGS. 5A through 6B, when the molten resin R is injected to the spaced portion 3 through the resin well 13 and the film gate 14, and the spaced portion 3 of the mold 1 is filled with the molten resin (in the injection mold), injection pressure of the molten resin R in the film gate 14 becomes uniform in the resin well 13 because the resin well 13 is once filled with the molten resin R. That is to say, the molten resin R flowing out of the film gate 14 can be injected to the spaced portion 3 with uniform injection speed on all positions in the periphery for the uniform injection pressure.

Therefore, the spaced portion 3 is uniformly filled with the molten resin R with the same height in the mold 1 (in the axis direction C') because the molten resin R is injected at the same speed through the film gate 14 having the same opening area (same thickness) around the periphery by the pressure controlling function of the resin well 13, and difference in flowing amount is eliminated. That is to say, irregularity in flowing velocity distribution, generated by gate configuration and irregular flowing amount of the molten resin R, is prevented by the pressure controlling function of the resin well 13. In other words, differences in flowing velocity distribution of the molten resin R in a lateral cross section of the spaced portion 3 can be eliminated.

And, the flowing speed of the molten resin R flowing into the resin well 13 through the plural pin runners 11 is high and varying according to the position of each of the pin runners 11. Therefore, when the molten resin R is injected directly (without the resin well 13) to the spaced portion 3, difference is generated in the flowing velocity distribution of the molten resin R, and the filling speed varies according to the positions. However, as shown in FIG. 5A and FIG. 6A, the molten resin R flowing out of the plural pin runners 11 hits the inner wall of the resin well 13, and then, the resin wall 13 is filled with the molten resin R. Therefore, even if the flowing speed from the pin runners 11 is irregular according to the positions of the pin runners 11, it does not influence the flowing speed of the molten resin R injected to the spaced portion 3. That is to say, the injection speed of the molten resin R influences only inner pressure in the resin well 13 (the injection pressure of the injection molding machine 7), and the spaced portion 3 can be uniformly filled with the molten resin R. As described above, the resin well 13 has a function that limits the varying flowing speed of the molten resin R through the pin runners 11 to regulate the flowing speed to the film gate 14.

As described above, the molten resin R is cooled after filled into the spaced portion 3 of the mold 1 to the same height in the axis direction C' in the mold 1 (refer to FIG. 7) by the flowing speed controlling function of the resin well 13. Therefore, distortion of the molded roller 36 caused by the deformation of the shaft 2 for the difference in the injection pressure of the molten resin R, irregularity of the molded roller 36 caused by the difference of cooling rate for the difference in the injection speed, and deterioration of surface roughness such as seams and patterns on the surface of the roller, are remarkably prevented.

And, according to the molding method of the present invention, the shaft 2 does not curve, distortion hardly occurs in the shaft 2 because the shaft 2 does not receive irregular force for the uniform flowing of the molten resin R, and when the roller 36 is used for a long time, especially in a long roller 36 having a high slenderness ratio, secular change such as deviation of the axis in the roller 36 can be reduced because remaining stress is hardly generated.

Next, results of dimensional inspection of the molded product of the present invention (with the resin well 13) and a conventional molded product (without the resin well 13) are shown in Table 1. And, the molding apparatus is disposed as the spaced portion 3 is in vertical direction as shown in FIG. 2. And, difference in outer diameter d in Table 1 means a difference between the maximum outer diameter and the minimum outer diameter of the roller, and total deflection s means a difference between the maximum position and the minimum position of the surface height in radial direction when the roller is rotated.

TABLE 1

|  | Product of the Present Invention | Conventional Example |
| --- | --- | --- |
| Difference in Outer Diameter d | 0.08 mm | 0.15 mm |
| Total Deflection ϵ | 0.15 mm | 0.30 mm |

As shown in Table 1, the molded product of the present invention can be molded with high accuracy in which the both of the differences in outer diameter d and the total deflection E are about 50% in comparison with that of the conventional product. And, surface condition of the molded product, namely seam pattern caused by difference in cooling the molten resin R, is improved. Therefore, the pressure controlling function of the resin well 13 is realized with a simple construction and very effective for improving dimensional accuracy in a molded product of the resin long body.

Figure 8:
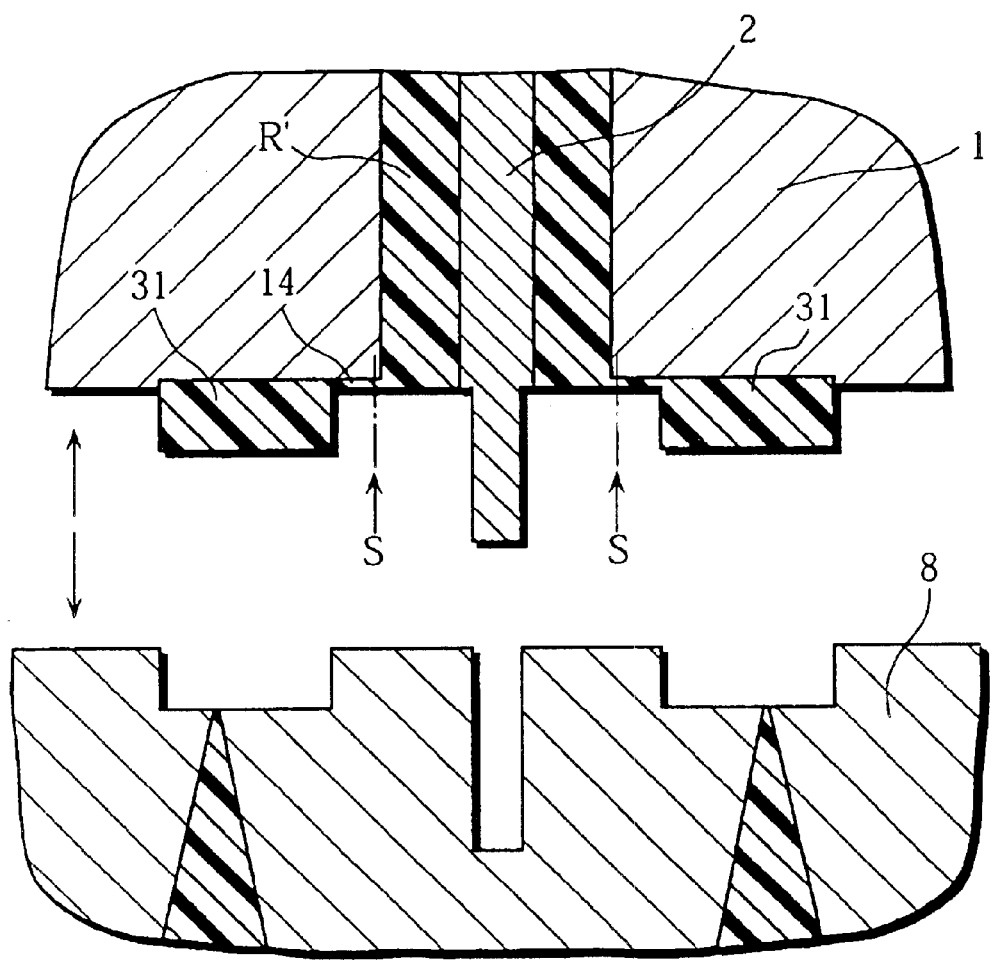
FIG. 8 is an enlarged cross-sectional view of a principal portion showing a constructional element.

Next, a method of taking the molded product out of the molding apparatus in FIG. 2 is described. As an enlarged cross-sectional view of the film gate 14 shown in FIG. 8, the mold 1, having the molded product composed of the shaft 2 and the resin R' covering the shaft 2, and the supplying passage main body 8 are separated. In this case, an unnecessary part 31 remaining on a lower part of the molded product, as shown with arrows S in FIG. 8, is cut by a punch member (cutting tool) 53 described later with FIGS. 24 and 29 at the part of the thin film gate 14. Then, the finished product is drawn out of the mold with the shaft 2. And, the unnecessary part 31 can be easily cut and removed by the cutting tool having a circular blade because the film gate 14 is composed of a thin flat plate.

And, the mold 1 is an integral cylindrical body having a round hole 9, and having no seam in the axis direction and the peripheral direction. That is to say, the mold 1 is not divided on the surface of the resin R' of the molded product. So staged portions and flash are not generated on the surface of the molded product, and secondary working (polishing the cylinder) is unnecessary to obtain a product with high surface accuracy. The number of production processes and production cost can be reduced thereby.

Figure 9:
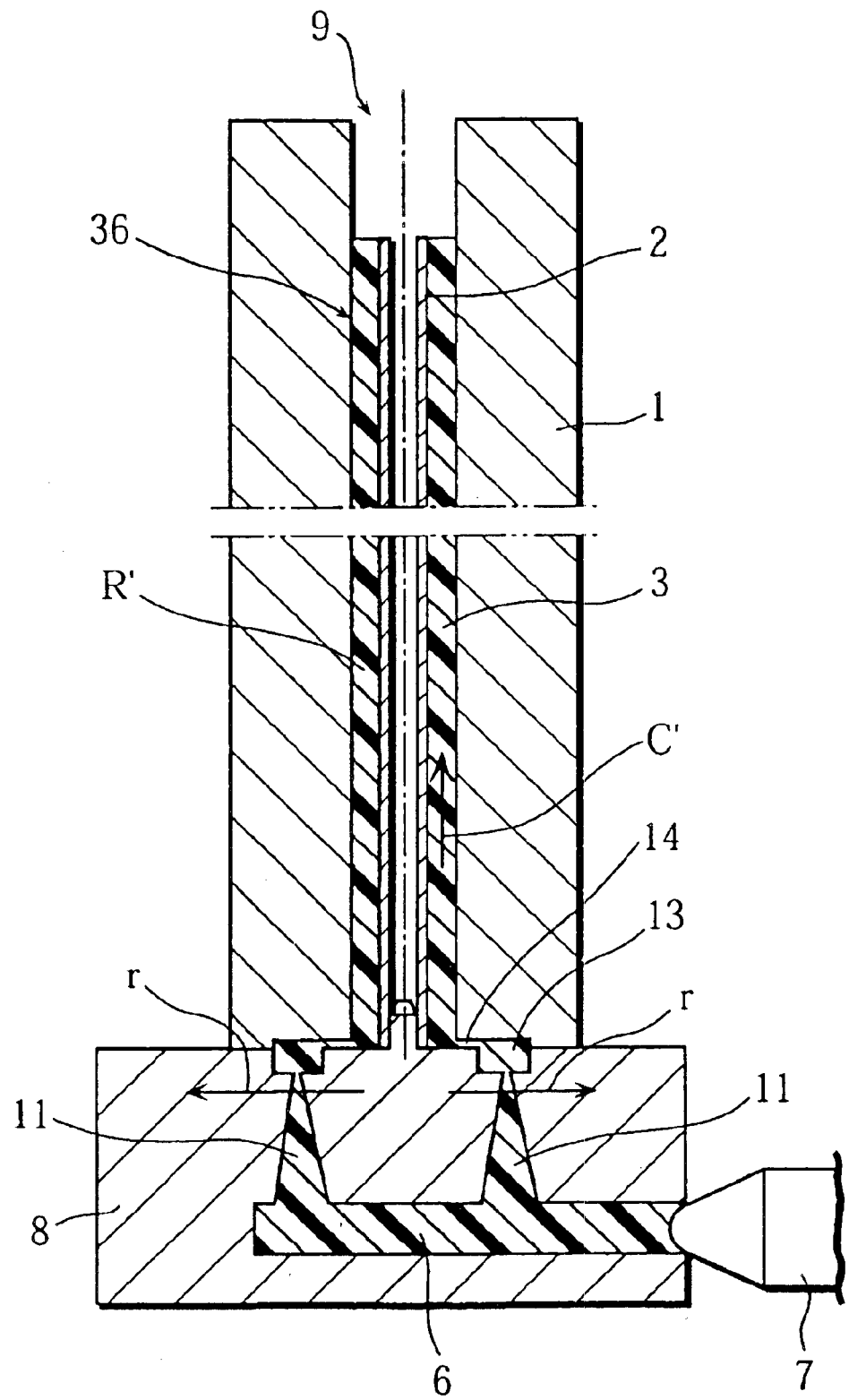
FIG. 9 is a cross-sectional side view showing still further embodiment of the molding apparatus of the present invention.

And, although the resin long body molded by the present invention in the above-described embodiment is the roller 36 having the shaft 2 in the center, and the resin R' covers the periphery of the shaft 2, the shaft 2 may be hollow (not solid) and covered by the resin R' to make a very accurate hollow resin long body (a compound pipe) as shown in FIG. 9. With this construction, a long compound pipe with very high strength and accuracy can be made.

Or, the shaft 2 disposed in the mold 1 may be repeatedly used as a part of the manufacturing apparatus (the mold 1) in some cases. That is to say, the shaft 2 may be drawn out of the molded product of the resin R' after the injection mold to make a resin pipe with high accuracy. As another embodiment, a compound pipe, in which a metal pipe is inserted to the resin pipe from which the shaft 2 is drawn out, can be made. Or, a metal shaft of a predetermined length may be inserted. With these constructions, a resin long pipe and shaft having a metal core can be made with the metal pipe and the metal shaft.

Figure 10:
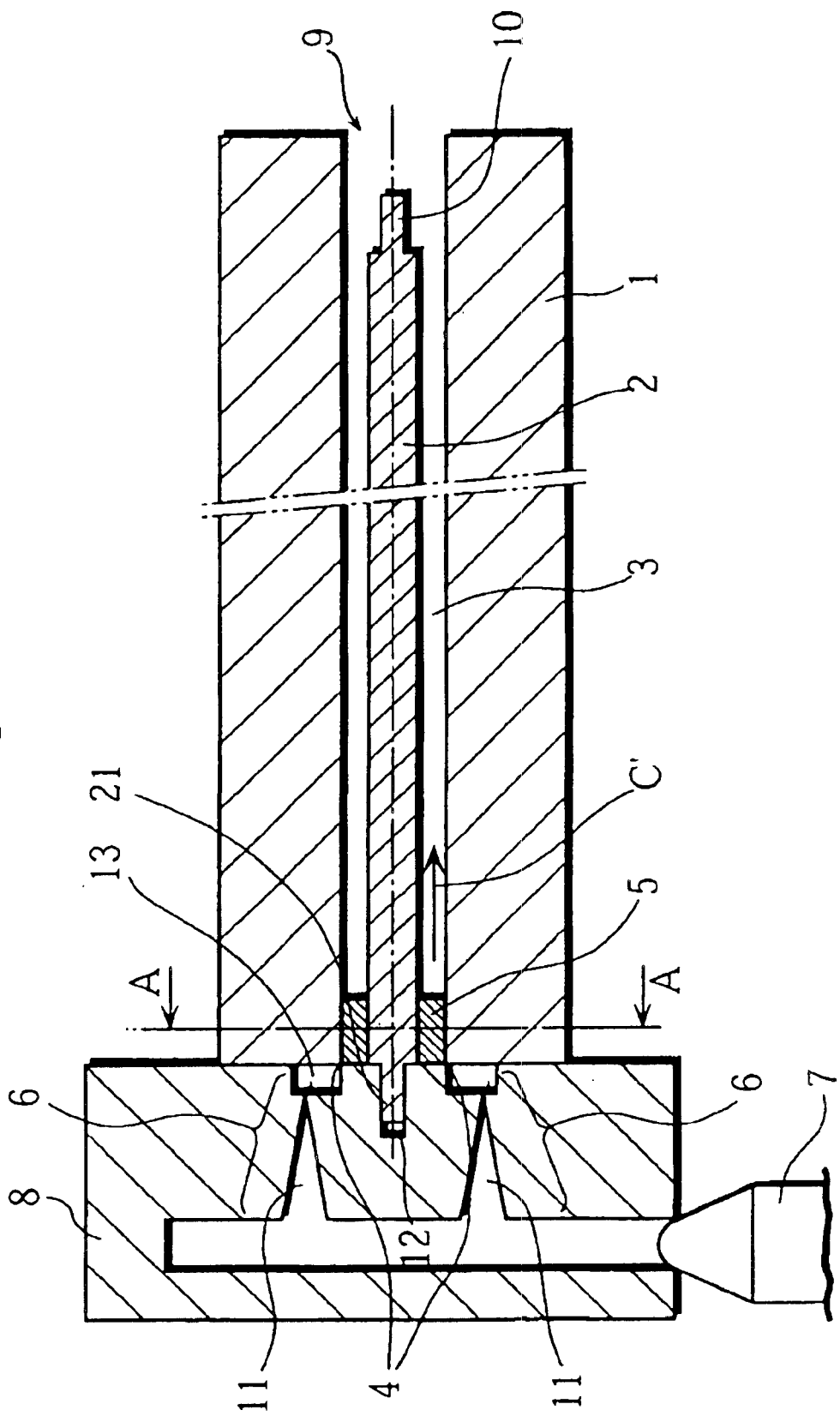
FIG. 10 is a cross-sectional side view showing another embodiment of the molding apparatus of the present invention.
Figure 11:
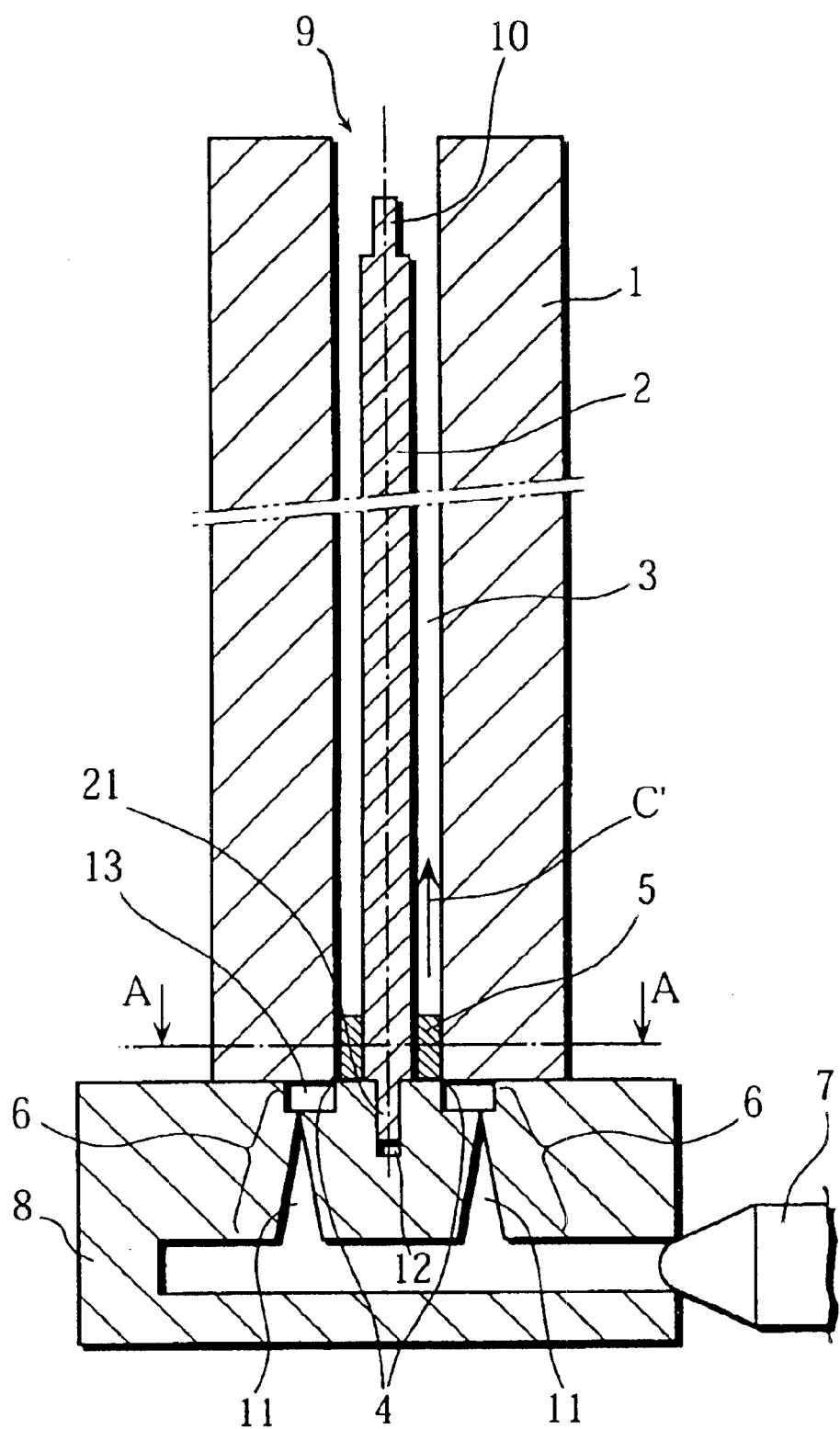
FIG. 11 is a cross-sectional side view showing still another embodiment of the molding apparatus of the present invention.

Next, FIG. 10 shows another embodiment of a molding apparatus for a resin long body relating to the present invention. This molding apparatus is composed of a mold 1 for injection molding can be disposed around a shaft 2 as a center, main body 8 of molten resin supplying passage, and a molten resin injection molding machine 7. The mold 1 has a round hole 9 for molding a long body, and a spaced portion 3 of ring (long and straight in the longitudinal direction), i.e. a cavity, is formed in the mold 1 by providing the shaft 2 to be inserted to the center of the round hole 9. The mold 1 and the shaft 2 are detachably fixed to the supplying passage main body 8 to which the injection molding machine 7 is connected. And, FIG. 11 shows still another embodiment of the invention, namely a molding apparatus for a resin long body in which the spaced portion 3 (mold 1) of ring is disposed in a longitudinal direction vertically, and the supplying passage main body 8 is disposed on a lower end side of the spaced portion 3. And, the spaced portion 3 of ring, not restricted to a circular ring, may have other cross-sectional configurations such as oval and rectangular.

Figure 17:
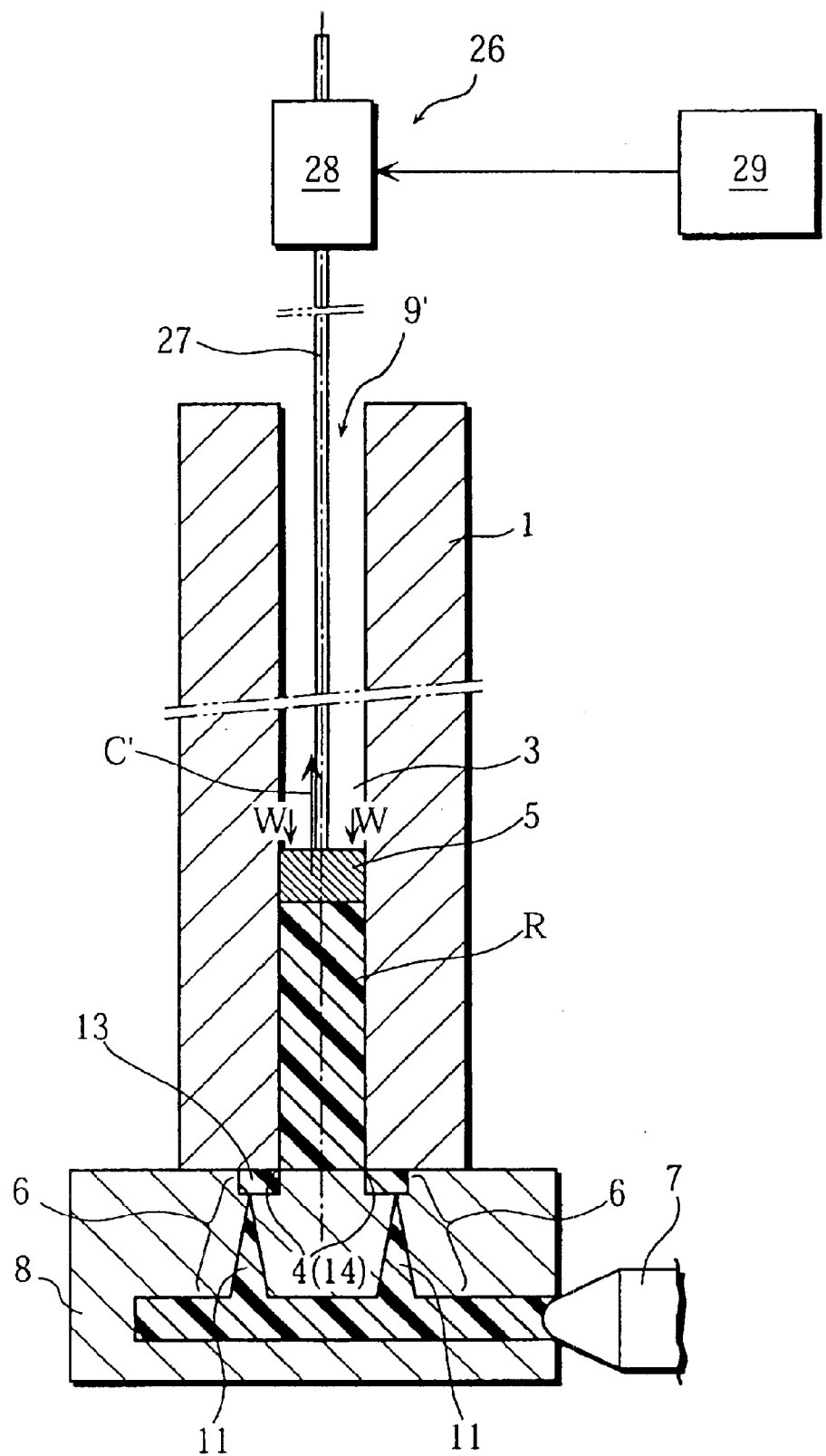
FIG. 17 is a cross-sectional side view showing still further embodiment of the molding apparatus of the present invention.

And, as described later in detail, a further embodiment of the molding apparatus is shown in FIG. 17. The mold 1 of the molding apparatus for resin long body in FIG. 17 has a forming hole 9' for a hollow long body and a spaced portion 3 of ring long and straight in the longitudinal direction, i.e. a cavity. The resin long body molded by this mold 1 may have cross-sectional configurations of hollow cylinder, square rod, and others.

The molding apparatus of the present invention shown in FIG. 10 and FIG. 11 is a molding apparatus in which a roller is made by covering the periphery of the metal shaft 2 with the molten resin R by injection mold. The shaft 2 has a protruding shaft 21 on the both ends, the protruding shaft 21 fits to a holding hole 22 on the supplying passage main body 8 to hold the shaft 2. And, the shaft 2 is corresponding to one of parts serially supplied to the mold 1 because the molded product obtained by covering the shaft 2 with the molten resin R is serially taken out of the mold 1.

And, the roller, made by the molding apparatus of FIGS. 10, 11, and 17, is used for OA appliances such as a copy machine, a printer, etc. which currently apt to correspond to high speed processing and large-sized paper. So especially long and accurate rollers are required.

Figure 12:
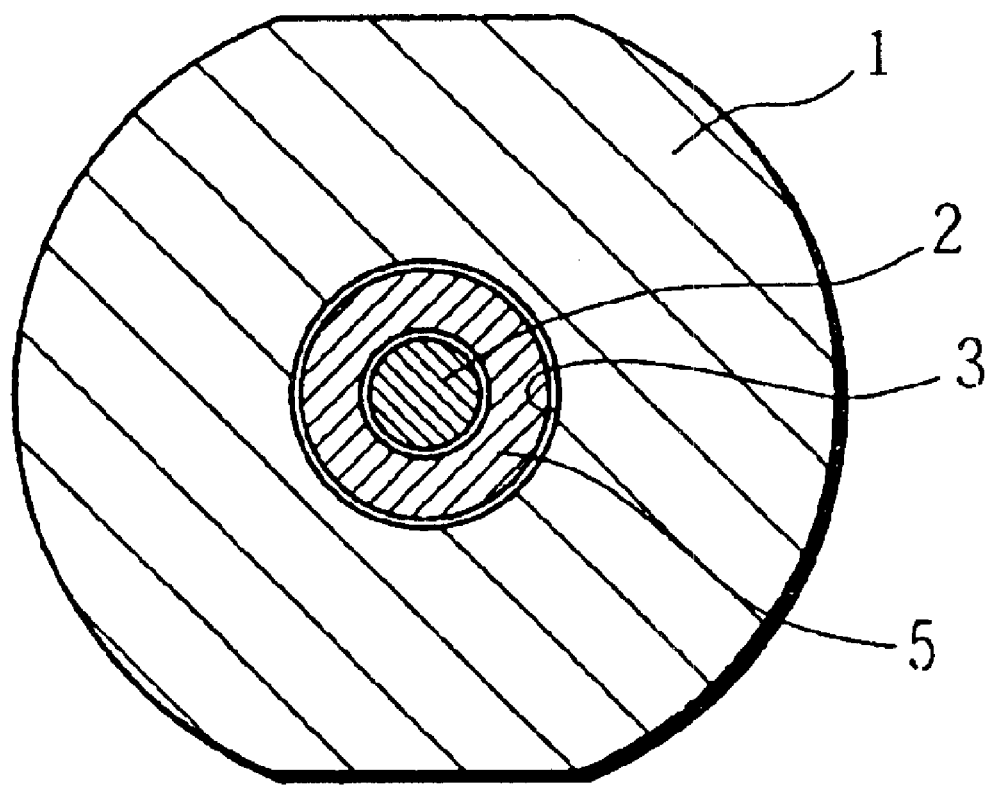
FIG. 12 is a lateral cross-sectional view of FIG. 10 and Figure

And, in the molding apparatus shown in FIG. 10 and FIG. 11, as shown in FIG. 12, a ring-shaped piston 5 is slidably disposed in the spaced portion 3 of ring in the mold 1. That is to say, the piston 5 is inserted to the mold 1 as the peripheral face of the piston 5 is slidable on the inner face of the mold 1 and the inner peripheral face of the piston 5 is slidable on the peripheral face of the shaft 2. And, the ring-shaped piston 5 is disposed in advance to contact a portion near the gate 4 of the supplying passage main body 8 or an end portion of the spaced portion 3 of ring.

In the apparatus shown in FIG. 17, a short cylinder-shaped piston 5 is slidably disposed in the spaced portion 3 of cylinder in the mold 1. That is to say, the piston 5 is inserted to the mold 1 as the peripheral face of the piston 5 is slidable on the inner face of the mold 1. And, the piston 5 is disposed in advance to contact a portion near the gate 4 of the supplying passage main body 8 or an end portion of the spaced portion 3.

Figure 14:
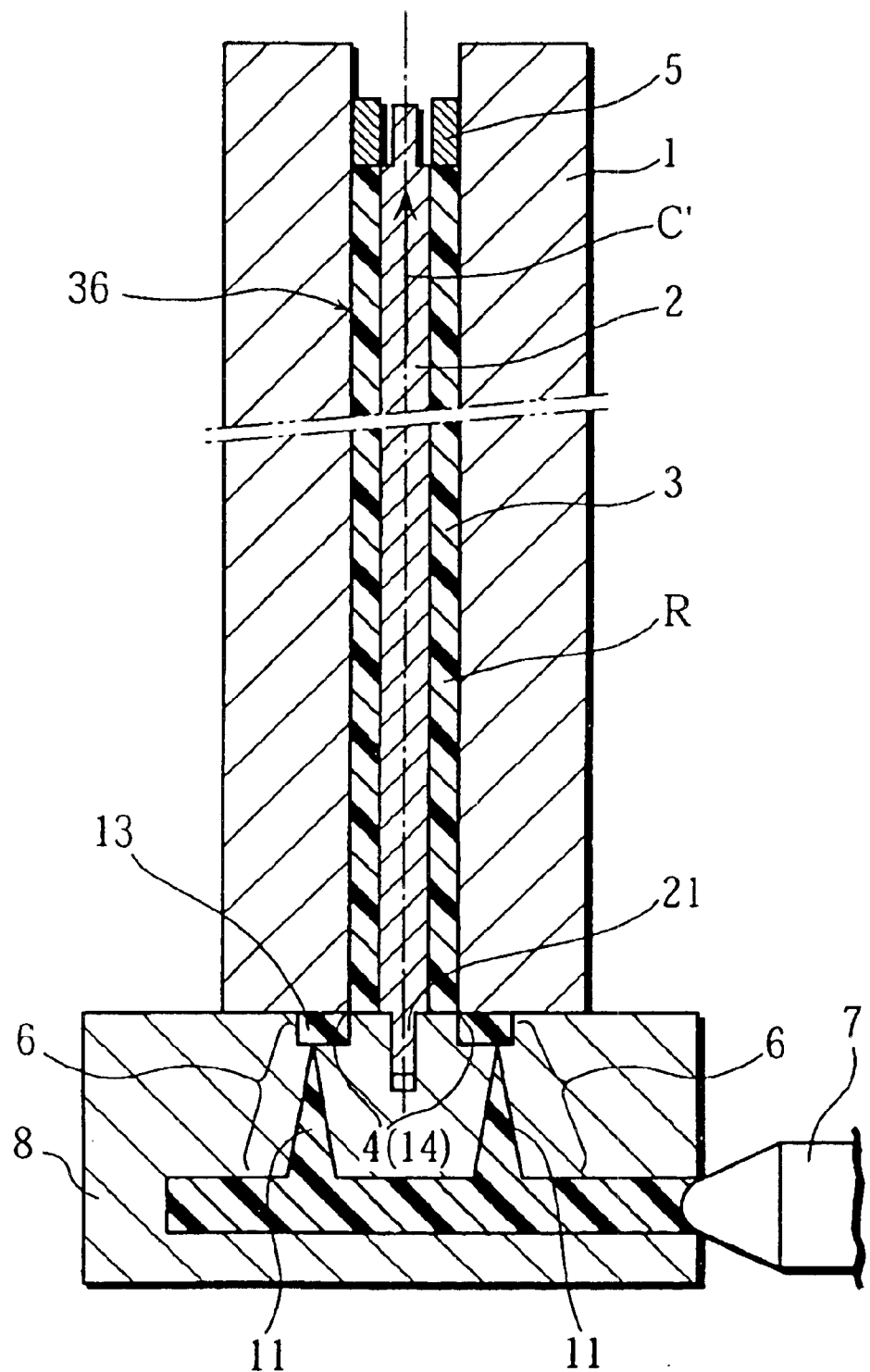
FIG. 14 is a cross-sectional side view of the molding apparatus showing a molded state.

The supplying passage main body 8 is provided with a gate 4 for injection of the molten resin R to the mold 1 and supplying passages 6, and the nozzle of the injection molding machine 7, freely pressed to and separated from the main body 8, is pressed and connected to the start point of the main body 8. In the construction above, heat-plastic molten resin R is injected from the gate 4 through the supplying passages 6, filled into the spaced portion 3 of the mold 1 and cooled and solidified to obtain a finished roller 36 outserted to the shaft 2 as shown in FIG. 14 and a hollow long product (roller) not shown in Figures. The cross-sectional configuration of the molded roller, according to the cross-sectional configuration of the mold, may be oval or polygonal.

Figure 13:
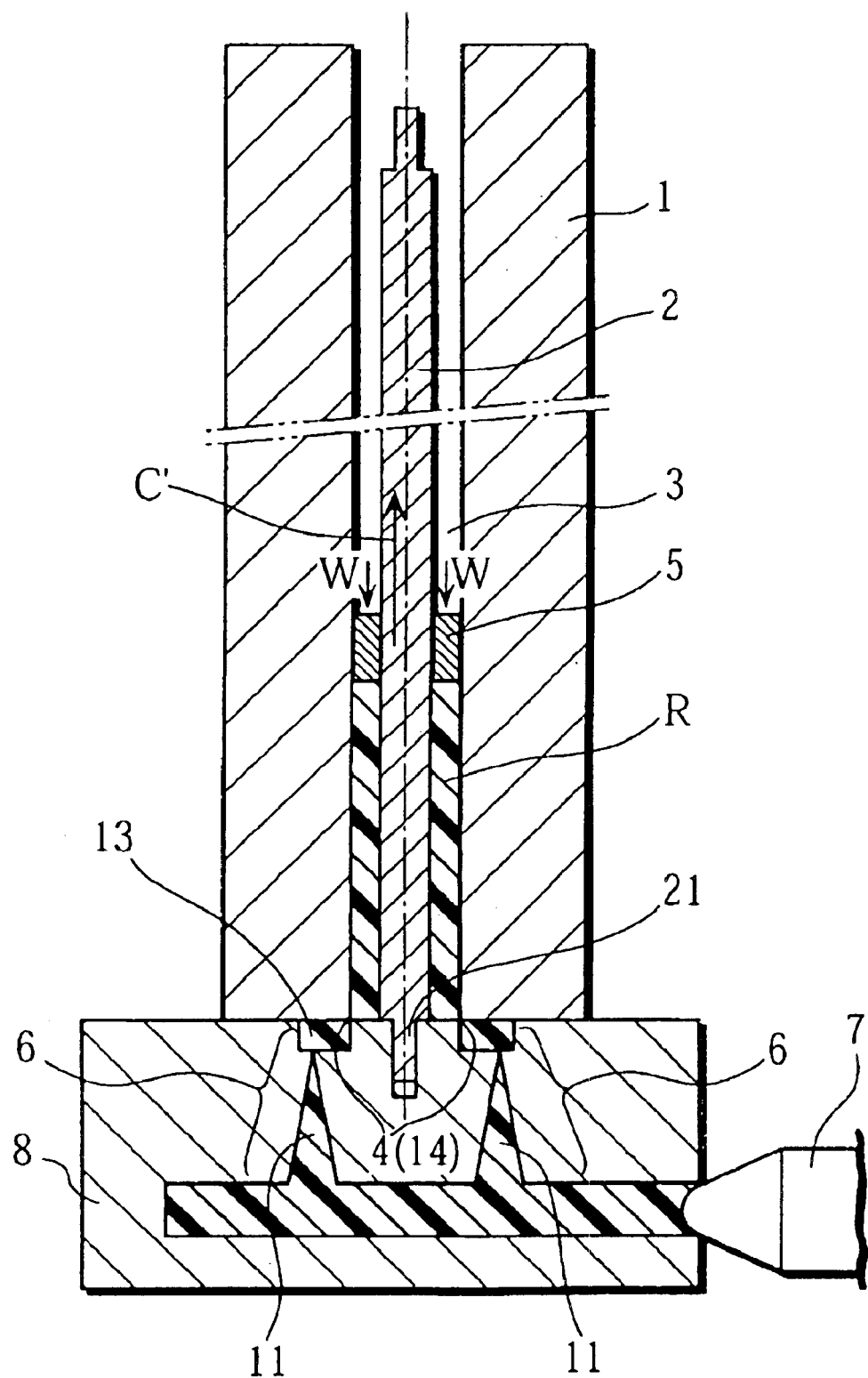
FIG. 13 is a cross-sectional side view of the molding apparatus showing a molding state.

In the molding apparatus of the present invention, the piston 5 is disposed slidably in the spaced portion 3 just before (near) the gate 4 when the molten resin R is injected from the gate 4 into the spaced portion 3 through the supplying passages 6 and filled into the spaced portion 3 in the mold 1 (in injection molding), the molten resin R pushes up the piston 5 against sliding resistance W of the piston 5, and the spaced portion 3 is filled with the molten resin R with the forth end (upper end) of the molten resin R at the same height (in the axis direction C') as shown in FIG. 13 and FIG. 17. That is to say, irregularlity in flowing velocity distribution, caused by various configurations of the gate, difference of flowing amount, etc., is not generated, or reduced at least. That is to say, the difference in the flowing velocity distribution of the molten resin R in the same lateral cross section of the spaced portion can be eliminated or reduced (diminished) by the sliding resistance W of the piston 5.

As described above, the molten resin R is cooled after filled into the spaced portion 3 of the mold 1 to the same height in the axis direction C' in the mold 1 by the flowing speed controlling function of the piston 5 with the sliding resistance W. Therefore, distortion of the molded roller 36 caused by the deformation of the shaft 2 for the difference in the injection pressure of the molten resin R, irregularity of the molded roller 36 caused by the difference of cooling rate for the difference in the injection speed, and deterioration of surface roughness such as seams and patterns on the surface of the roller, are remarkably prevented.

And, according to the molding method of the present invention, the shaft 2 does not curve, distortion hardly occurs in the shaft 2 because the shaft 2 does not curve for the uniform flowing of the molten resin R, or for the reduced irregularity in comparison with FIG. 10, and when the roller 36 is used for a long time, especially in a long roller 36 having a high slenderness ratio, secular change such as deviation of the axis in the roller 36 can be reduced because remaining stress is hardly generated.

And, the flowing speed controlling function of the piston 5 has a larger effect when the mold 1 is disposed vertically in the longitudinal direction as shown in FIG. 11 and FIG. 17 than when the mold 1 is disposed horizontally in a lateral direction as shown in FIG. 10 because the vertical disposition is more preferable for the speed control function of the sliding resistance W by self weight of the piston 5 and uniformity of potential energy of the molten resin R itself in the spaced portion 3.

And, as shown in FIG. 10, FIG. 11, and FIG. 17, a film gate 14 of ring (periphery) in radial directions of the spaced portion 3 is connected to an end portion (lower end portion in FIG. 11 and FIG. 17) of the spaced portion 3 of the mold 1 in an axis direction C'. A resin well 13 having a configuration of an enlarged hollow ring in cross section is connected to another end side of the film gate 14. The resin well 13 has a space in the axis direction C and the radial directions of the spaced portion 3, and forms a short cylinder having a ring-shaped cross-sectional configuration. And, plural pin runners 11 (pin-shaped sprues) are disposed in the resin well 13 in the axis direction C' described above. And, connection position of the pin runner 11 with the resin well 13 is preferably part from the film gate 14 connected to the resin well 13. And, the configuration of the film gate 14 and the resin well 13, not restricted to ring, may be peripheral (continuous form corresponding to the cross-sectional configuration of the spaced portion 3).

The molten resin supplied by the injection molding machine 7 is sent to the plural pin runners 11, and flows into the resin well 13 having a configuration of an enlarged hollow ring in cross section through the pin runners 11. Then, the molten resin R, immediately after the resin well 13 is filled with the molten resin, is pressed to the film gate 14 to flow into the spaced portion 3 of the mold 1.

Therefore, when the molten resin R is injected to the spaced portion 3 through the resin well 13 and the film gate 14, and the spaced portion 3 of the mold 1 is filled with the molten resin (in the injection mold), injection pressure of the molten resin R from the film gate 14 becomes uniform in the resin well 13 because the resin well 13 is once filled with the molten resin R. That is to say, the molten resin R flowing out of the film gate 14 can be injected to the ring-shaped spaced portion 3 with uniform injection speed on all positions in the periphery for the uniform injection pressure.

Therefore, the spaced portion 3 is uniformly filled with the molten resin R with the same height in the mold 1 (in the axis direction C') because the molten resin R is injected at the same speed through the film gate 14 having the same opening area (same thickness) around the periphery by the pressure controlling function of the resin well 13, and difference in flowing amount is eliminated. That is to say, irregularity in flowing velocity distribution, generated by gate configuration, irregular flowing amount of the molten resin R, is prevented by the pressure controlling function of the resin well 13. In other words, differences in flowing velocity distribution of the molten resin R in a lateral cross section of the ring-shaped spaced portion 3 can be almost eliminated.

And, the flowing speed of the molten resin R flowing into the resin well 13 through the plural pin runners 11 is high and varying according to the position of each of the pin runners 11. Therefore, when the molten resin R is injected directly from the pin runners 11 (without the resin well 13) to the spaced portion 3, difference is generated in the flowing velocity distribution of the molten resin R, and the filling speed varies according to the positions in the ring-shaped spaced portion 13. However, as shown in FIG. 5A and FIG. 6A, the molten resin R flowing out of the plural pin runners 11 hits the inner wall of the resin well 13, and then, the resin well 13 is filled with the molten resin R. Therefore, even if the flowing speed from the pin runners 11 is irregular according to the positions of the pin runners 11, it does not influence the flowing speed of the molten resin R injected to the spaced portion 3. That is to say, the injection speed of the molten resin R influences only inner pressure in the resin well 13 (the injection pressure of the injection molding machine 7), and the spaced portion 3 can be uniformly filled with the molten resin R. As described above, the resin well 13 has a function that limits the varying flowing speed of the molten resin R through the pin runners 11 to regulate the flowing speed to the film gate 14.

As described above, distortion of the molded roller 36 after the molding, irregularity in the outer diameter of the molded roller 36, and deterioration of surface roughness, are remarkably prevented further by the flowing speed controlling function of the resin well 13 in comparison with the case in which the molding is conducted only with the piston 5.

And, as shown in FIG. 17, the piston 5 may be provide with a resistance adding means 26 to regulate the moving speed of the piston 5 and control the flowing of the resin R. This means 26 activates the piston 5 corresponding to the injection rate (filling rate) of the molten resin R. That is to say, the piston 5 is moved in resin flowing direction faster than the filling speed of the molten resin R (negative load) when the flowing resistance of the resin R itself is high in an early stage of the molding, and moved slowly in the middle of the molding to make apparent sliding resistance W (positive load).

To describe the resistance adding means 26 concretely, as shown in FIG. 17, for example, a connecting rod 27 is connected to the piston 5 and a braking (driving) device 28, controlling the upward moving speed of the connecting rod 27, is connected to the connecting rod 27. The braking (driving) device 28 pulls the connecting rod 27 upward and brakes the piston 5 (and the connecting rod 27) pushed up by the flow of the resin R. Speed regulation of the connecting rod 27 (the piston 5) is switchable during the molding, for example, set by a control means 29 corresponding to stroke positions of the connecting rod 27 (the piston 5) in advance. Or, the braking (driving) device 28 may be cooperating with the injection molding machine 7 and controlled through the operation of the injection molding machine 7 (injection speed of the molten resin R).

As a simple construction of the resistance adding means 26, the mold 1 is disposed vertically in the longitudinal direction to keep the sliding resistance W of the piston 5, and flowing resistance is added to the molten resin R to control the flowing speed. That is to say, the connecting rod 27 is connected to the piston 5, and a mass adding body, although not shown in Figures, is connected to the forth end of the connecting rod 27 to add resistance caused by these members as the sliding resistance W.

And, various sliding added bodies may be connected to the piston 5 through the connecting rod 27 to make resistance as the sliding resistance W against the movement of the piston 5.

With the resistance adding means 26 having speed controlling function, the piston 5 is not abruptly moved by the injection pressure of the molten resin R, and productivity is enhanced thereby.

The sliding resistance W, generated by friction on the sliding faces of the mold 1, the shaft 2, and the piston 5, can be regulated by the means as described above because it is difficult to control mutual dimensional accuracy of the parts above.

And, the piston 5 is made of plastic, preferably an engineering plastic which can resist the injection heat and pressure, and have slidability as not to damage the mold 1 and the shaft 2. The piston 5 may be of other materials such as copper, etc, which do not damage the mold 1 and the shaft 2.

Figure 15:
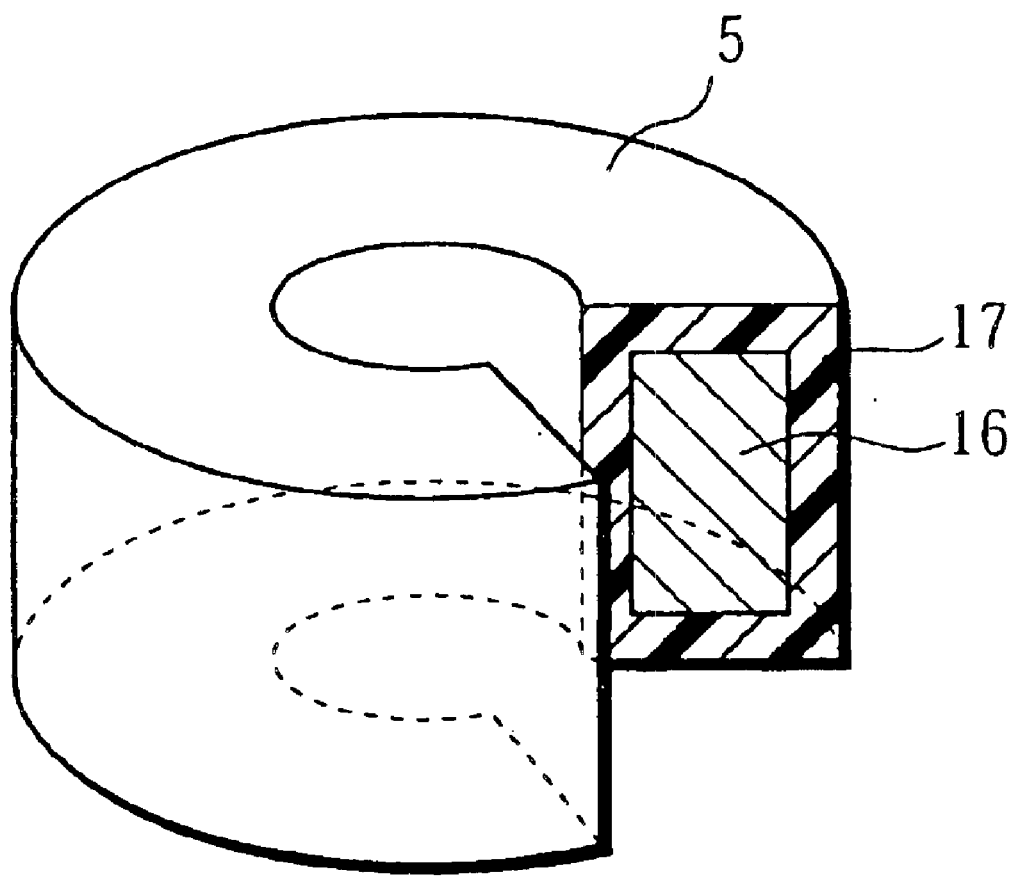
FIG. 15 is a perspective view with a partial cross section showing a constructional element.

A construction to provide the piston 5 with a simple adding mechanism for make the sliding resistance W, as shown in FIG. 15, may be a metal ring 16 covered by plastic 17. Resistance of the self weight of this piston 5 is added as the sliding resistance W. That is to say, the sliding resistance W can be changed by changing the material of the piston 5. The piston 5, other than the ring, may be a long cylinder or a cylinder one of which ends is closed according to the form of the mold 1 as described above.

Therefore, the construction above can correspond to changes of the injection pressure and filling speed of the molten resin R by the injection molding machine, or sizes and length of the molded product because the sliding resistance W can be easily and freely changed with the adding mechanism on the piston 5.

And, in a case that the piston 5 is ring-shaped, and especially the diameter of the shaft 2 in the mold 1 is small, the construction above also works as that the shaft 2 is not deformed by the injection pressure, and the ring-shaped piston 5 regulate the core of the shaft 2 during the molding because the molten resin R, sliding on the peripheral face of the shaft 2, is filled to the spaced portion 3 of ring and solidified. And, although the shaft 2 is slightly unstable when held only by the protruding shaft 21 on the supplying passage main body 8, further accurate product can be obtained because the piston 5 supports the shaft 2.

Therefore, the molded product is injection-molded as FIG. 14 without bending the shaft 2 and irregularity on the surface.

Next, a method of taking the molded product out of the molding apparatus in FIG. 11 is described. As an enlarged cross-sectional view of the gate 4 shown in FIG. 8, the mold 1, having the molded product composed of the shaft 2 and the resin R' covering the shaft 2, and the supplying passage main body 8 are separated. In this case, an unnecessary part 31 remaining on a lower part of the molded product, as shown with arrows S in FIG. 8, is cut by a punch member (cutting tool) 53 described later with FIGS. 24 and 29 at the part of the gate 4 where the supplying passage 6 for the molten resin R becomes thin. Then, the finished product is drawn out of the mold with the shaft 2. And, the unnecessary part 31 can be easily cut and removed by the cutting tool 4 having a circular blade when the gate 4 is composed of a thin flat plate as in FIG. 8.

Next, in a case that the outer diameter of the roller is 12 mm, the length is 350 mm, and the outer diameter of the shaft 2 is 8 mm, dimensional inspection results of hollow molded products (only with the piston 5, and with the piston 5 and the resin well 13) according to the present invention and a conventional hollow molded product (without both of the piston 5 and the resin well 13), are shown in Table 2. The molding apparatus is disposed as the spaced portion is vertical in longitudinal direction as shown in FIG. 11. The difference in outer diameter d in Table 2 means a difference between the maximum outer diameter and the minimum outer diameter of the roller, and total deflection $\epsilon$ means a difference between the maximum position and the minimum position of the surface height in radial direction when the roller is rotated.

TABLE 2

|  | Present Invention (Embodiment 1) with piston 5 | Present Invention (Embodiment 2) with piston 5 and resin well 13 | Conventional Example |
| --- | --- | --- | --- |
| Difference in Outer Diameter d | 0.09 mm | 0.05 mm | 0.15 mm |
| Total Deflection $\epsilon$ | 0.18 mm | 0.10 mm | 0.30 mm |

As shown in table 2, the embodiments according to the present invention, in which both of the difference in outer diameter d and the total deflection $\epsilon$ are 30% of that of the conventional product in Embodiment 1 and about 60% of that of the conventional product in Embodiment 2, can be molded with very high accuracy. And, surface condition of the molded product, namely seam pattern caused by difference in cooling the molten resin R, is improved. Therefore, the flowing speed controlling function of the piston 5 and the resin well 13 is realized with a very simple construction and very effective for improving dimensional accuracy in a molded product of the resin long body.

Figure 16:
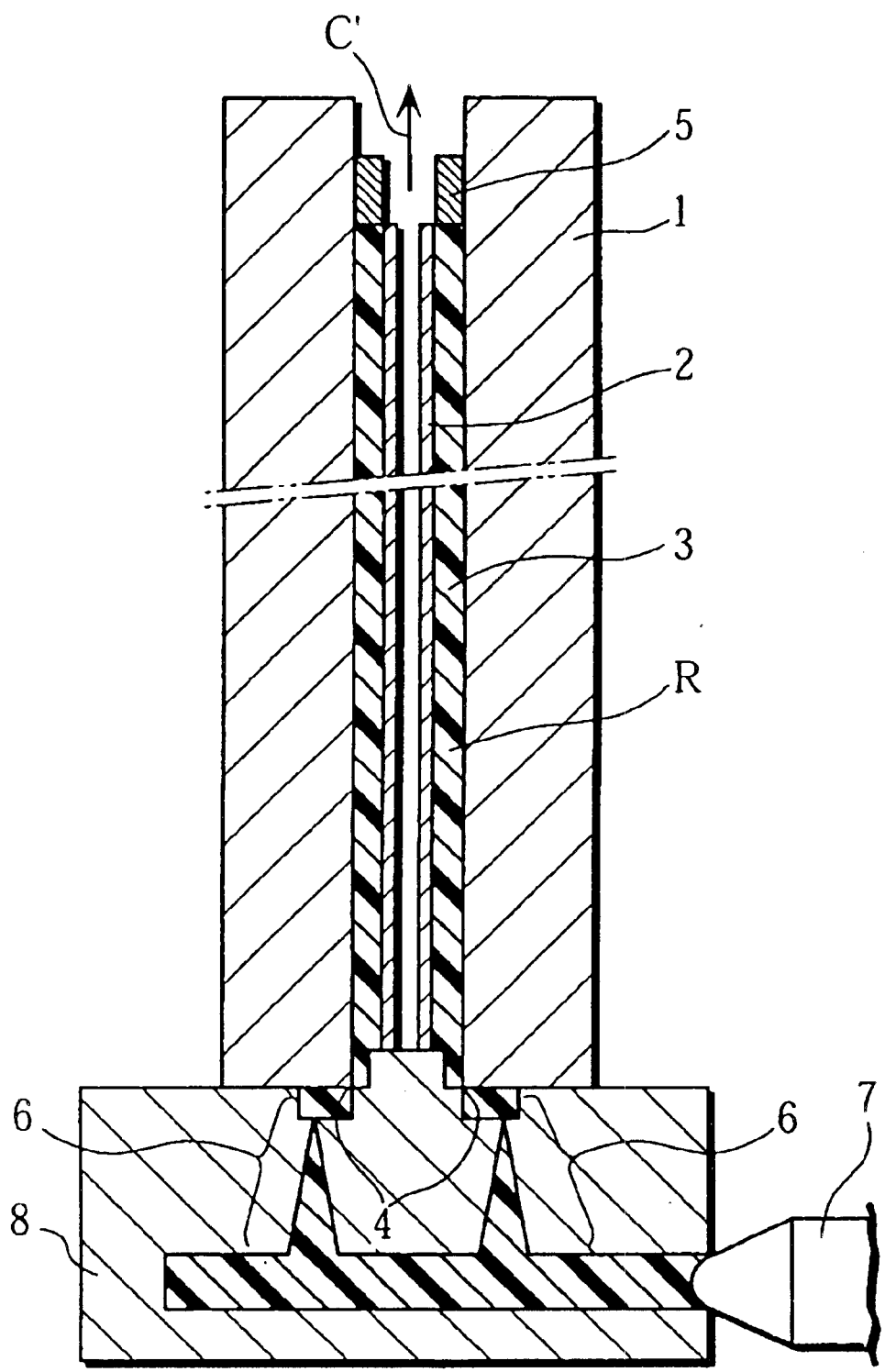
FIG. 16 is a cross-sectional side view showing further embodiment of the molding apparatus of the present invention.

And, although the resin long body molded by the present invention in the above-described embodiment is the roller 36 having the shaft 2 in the center and the resin R' covers the periphery of the shaft 2, the shaft 2 may be hollow (not solid) and covered by the resin R to make a very accurate hollow resin long body (a compound pipe) as shown in FIG. 16. With this construction, a long compound pipe with very high strength and accuracy can be made.

Or, the shaft 2 disposed in the mold 1 may be repeatedly used as a part of the manufacturing apparatus (the mold 1) in some cases. That is to say, the shaft 2 may be drawn out of the molded product to make a resin pipe with high accuracy. As another embodiment, a compound pipe, in which a metal pipe is inserted to the resin pipe from which the shaft 2 is drawn out, can be made. Or, a metal shaft of a predetermined length may be inserted. With these constructions, a resin long pipe and shaft having a metal core can be made with the metal pipe and the metal shaft.

And, in the case that the piston 5 is a control cylinder (disc) without central bore as shown in FIG. 17, a hollow resin shaft with high accuracy can be made by insertion of the control cylinder (the piston 5) slidably into the hole 9' of the mold 1 in FIG. 10 and FIG. 11 without the shaft 2 in the mold 1. Although flowing, filling, and cooling speed of the molten resin R may become irregular in the same lateral cross section of the hollow shaft, the outer diameter of the product may varies, and striped pattern may be generated especially in the case that the gate 4 for jetting the molten resin R is a pin gate, the flowing velocity distribution can be kept uniform by use of the control disc and the inconvenience and defection can be prevented.

Figure 18:
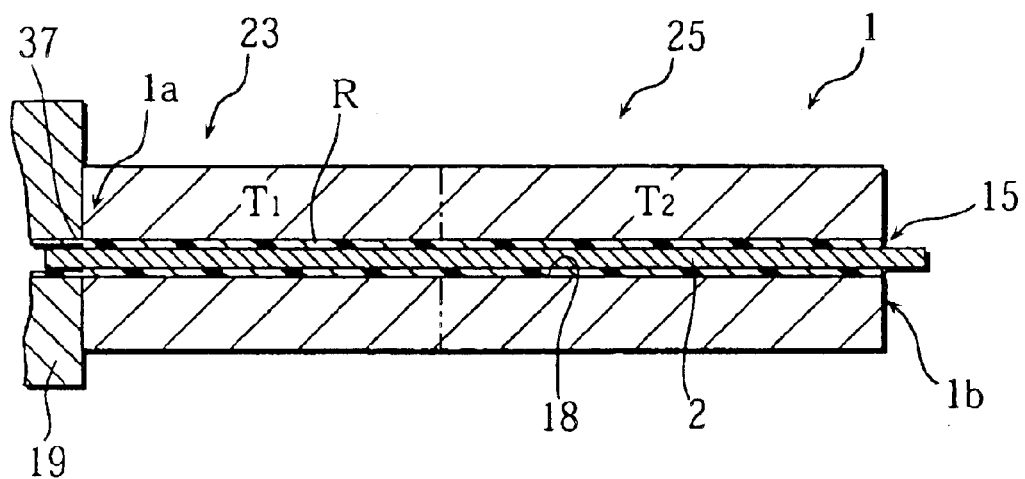
FIG. 18 is a cross-sectional side view showing another embodiment of the molding apparatus of the present invention.

Next, FIG. 18 shows still further embodiment of the molding apparatus for resin long body relating to the present invention. The resin long body molded by this mold 1 is, for example, a product having high slenderness ratio of heat plastic resin such as ABS resin, concretely, a resin roller (pipe) having a small diameter and a large longitudinal dimension, a thin plate member, etc.

To describe the mold 1 in FIG. 18, a cavity 15 formed in a central portion of the mold 1 is straight in the longitudinal direction of the mold 1 and having a circular cross-sectional configuration, and a shaft 2 is disposed in the center of the cavity 15. Therefore, the molten resin R is filled between an inner wall face 18 and a peripheral face of the shaft 2, and a roller is obtained after the molten resin is solidified. The shaft 2 is inserted to a insertion hole in a second mold 19 continued from an end portion (base end portion) 1a of the mold 1 and fixed as the axis of the mold 1 (cavity 15) is the central axis. And, as another embodiment, the shaft 2 in the cavity 15 may be omitted and the molded product may be a hollow resin roller.

A resin injection hole 37 to inject the molten resin R into the cavity 15 is formed on the end portion 1a side of the mold 1. The resin injection hole 37 is an opening on an end face of the cavity 15 and an exit of a cylindrical film gate of which central axis is the axis of the mold 1 (cavity 15). And, the resin injection hole 37 is to inject the molten resin R, flowing through runners and sprues (not shown in Figures) of the second mold 19, into the cavity 15 having a ring-shaped cross section uniformly in peripheral direction. The configuration of the gate portion may be other than the film gate, namely, may be a configuration of a pin gate, etc.

And, the mold 1 is divided into at least two areas in the longitudinal direction (the direction of the axis), namely, into the end portion 1a side and the other end portion 1b side bordering on a two-dot broken line in an approximate center portion of the mold 1 in FIG. 18, and temperature on an upstream side is set to be higher than that on a downstream side. The resin injection hole 37 side is the upstream side and the other end 1b side is the downstream side, and they are corresponding to the flowing direction (filling direction) of the molten resin R.

Further, temperature of the most upstream side having the resin injection hole 37 is set to be near the melting point (heat-deformation temperature) of the molded resin, and temperature in the area on downstream side to the most upstream side is set to be sufficiently lower than the melting point (heat-deformation temperature) of the resin.

That is to say, in FIG. 18, about a half of the mold 1 on the upstream side (the resin injection hole 37 side) is an early filling portion 23, and about another half of the mold 1 on the downstream side is a late filling portion 25. And, temperature $T_1$ of the early filling portion 23 is set to be higher than temperature $T_2$ of the late filling portion 25 ($T_1 > T_2$) when the injection (injection molding) of the molten resin R is conducted from the resin injection hole 37.

And, the temperature $T_1$ of the early filling portion 23 of the mold 1 is set to be near the heat-deformation temperature of the molded resin, and the temperature $T_2$ of the late filling portion 25 is set to be sufficiently lower than the heat-deformation temperature of the resin.

To describe concretely, in a case that the molten resin R to be injected to the cavity 15 is ABS resin, for example, when the heat-deformation temperature (melting point) of the ABS resin is 80° C., the temperature $T_1$ of the early filling portion 23 of the mold 1 is kept to be approximately 80° C., and the temperature $T_2$ of the late filling portion 25 is set to be about 30° C. And, when the molten resin R to be injected to the cavity 15 is another heat-plastic resin (polypropylene, for example), the temperature $T_1$ of the early filling portion 23 is set to be near a temperature corresponding to the heat-deformation temperature of the resin.

The temperature operation of the mold 1, although not shown in Figures, is conducted with a composition of a heater in the mold 1 (or on the surface of the mold 1), a temperature detecting means such as a thermocouple, and a temperature control means controlling the heater based on the detected value of the temperature detecting means to keep a predetermined temperature in each area of the mold 1. And, each divided area can have a range of predetermined temperature when each divided area is provided with the heater, the temperature detecting means, and the temperature control means (as a set). Or, the divided areas may be sharing the temperature control means which controls each of the areas.

In the mold 1 shown in FIG. 18, temperature operation is conducted as the temperature $T_1$ of the early filling portion 23 is kept to be approximately stable, the temperature $T_2$ of the late filling portion 25 is approximately stable, and a bordering portion of the early filling portion 23 and the late filling portion 25 (a portion around the two-dot broken line) is a transition area having temperature gradient. As another embodiment, each of the divided areas may have temperature gradient as the temperature decreases toward the other end portion (forth end portion) 1b side to mold the long body with further accuracy.

Figure 19:
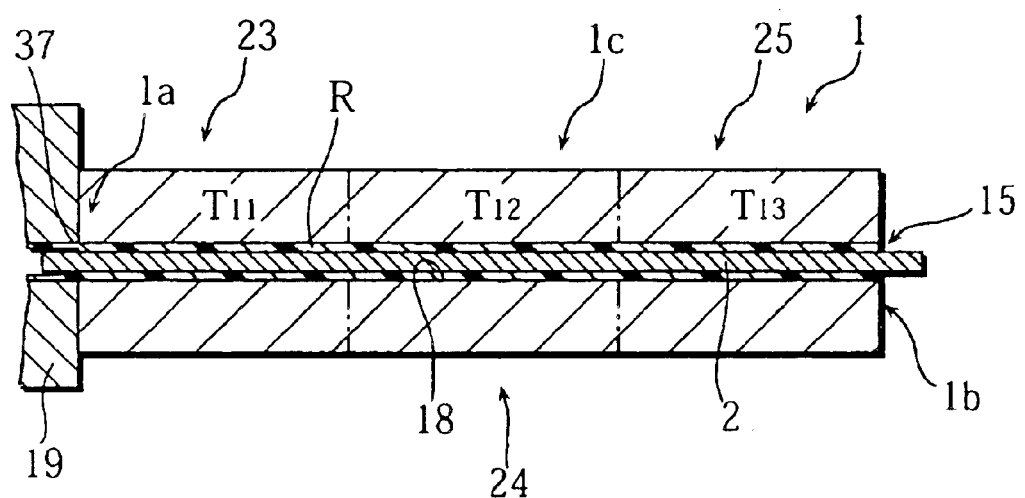
FIG. 19 is a cross-sectional side view showing still another embodiment of the molding apparatus of the present invention.

Next, another embodiment of the present invention is shown in FIG. 19. The mold 1 in FIG. 19 is divided into three areas, namely, an end portion 1a side, a middle portion 1c, and another end portion 1b side each of which has approximately same area, and temperature in an area on the upstream side is set to be higher than that of another area on the downstream side.

That is; to say, in FIG. 19, the end portion 1a area in the mold 1 (the injection hole 37 side) is the early filling portion 23, the middle portion 1c area is a middle filling portion 24, and the remaining area on the downstream side is the late filling portion 25. Temperature $T_{11}$ of the early filling portion 23 is set to be higher than temperature $T_{12}$ of the middle filling portion 24 is set to be higher than temperature $T_{13}$ of the late filling portion 25 ($T_{11} > T_{12} > T_{13}$) when the injection (injection molding) of the molten resin R is conducted from the injection hole 37.

And, the temperature $T_{11}$ of the early filling portion 23 of the mold 1 is set to be near the melting point (the heat-deformation temperature) of the injection-molded resin, and the temperature $T_{12}$ of the middle filling portion 24 and the temperature $T_{13}$ of the late filling portion 25 are set to be lower than the melting point (the heat-deformation temperature) of the resin as to successively lower (toward the downstream side). To describe concretely, in a case that the molten resin R to be injected to the cavity 15 is ABS resin, for example, when the heat-deformation temperature (melting point) of the ABS resin is 80° C., the temperature $T_{11}$ of the early filling portion 23 of the mold 1 is kept to be approximately 80° C., the temperature $T_{12}$ of the middle filling portion 24 is kept to be about 55° C., and the temperature $T_{13}$ of the late filling portion 25 is set to be about 30° C.

Although the mold 1 is divided into three temperature areas, the mold 1 may be divided into more areas (the middle filling portion 24 may be divided into a first middle filling portion and a second middle filling portion) to mold the long body with further accuracy.

The temperature operation and the temperature area settings in the mold 1 of the embodiment in FIG. 19 is similar to that of the embodiment in FIG. 18.

Next, the molding method for resin long body, in which the molten resin R is injected through the resin injection hole 37 on the end portion 1a side of the mold 1, is described further in detail.

The injection molding is conducted with the mold 1 divided into at least two areas, in which mold temperature on the upstream side is set to be higher than that on the downstream side, the mold temperature on the most upstream side having the resin injection hole 37 is set to be near the melting point (heat-deformation temperature), and the mold temperature on the downstream side is sufficiently set to be lower than the melting point (heat-deformation temperature).

Figure 20:
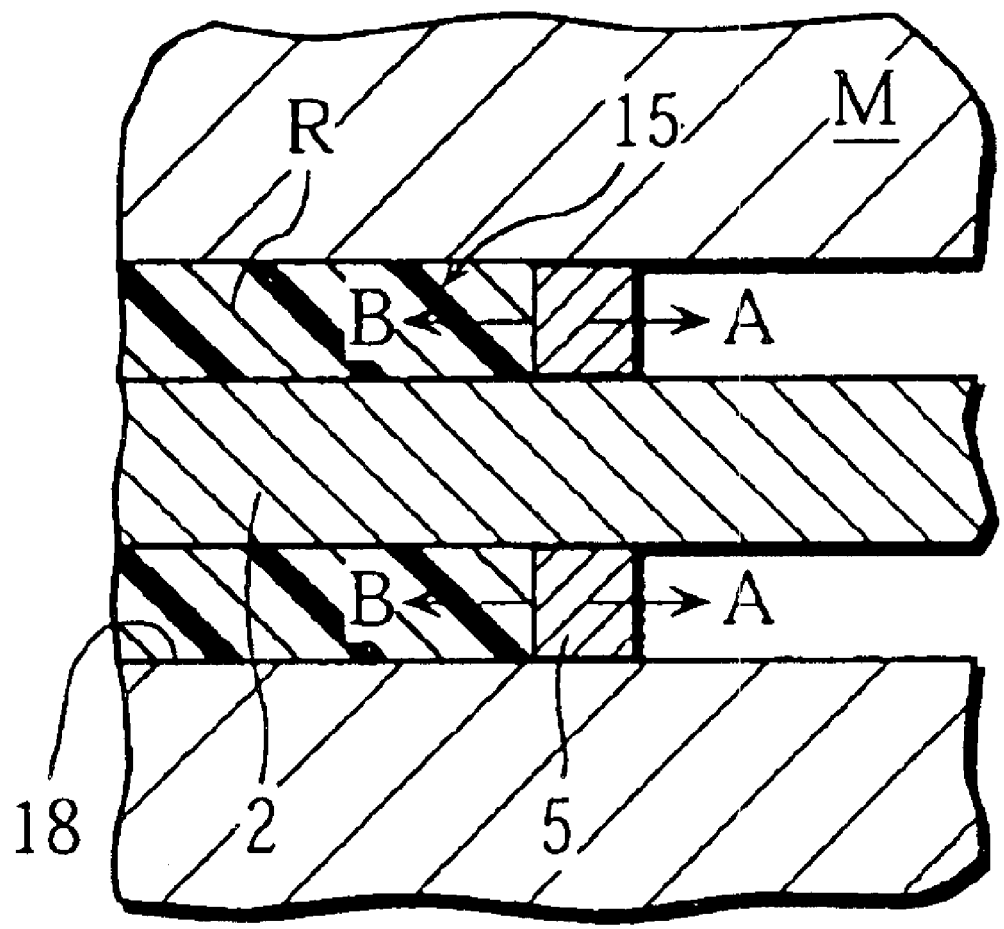
FIG. 20 is a cross-sectional view of a principal portion showing further embodiment of the molding apparatus of the present invention.

And, as shown in FIG. 20, the molten resin R may be filled into the cavity 15 pushing the piston 5, preliminarily disposed near the injection hole 37 of the cavity 15, in the axis direction (shown with arrows A). That is to say, as described with FIG. 10, the piston 5 is arranged slidable in the cavity 15 to give a predetermined sliding resistance toward the injection hole 37 (shown with arrows B) to the molten resin R supplied to the cavity 15. With this function, the flowing velocity distribution of the molten resin R supplied to the cavity 15 is made uniform in a lateral cross section of the cavity 15. Therefore, a long molded product with high dimensional accuracy can be molded with the flowing speed controlling function.

After the cavity 15 is filled with the molten resin R, retention pressure is loaded on the (molten) resin from the injection hole 37. This retention pressure, lower than the injection pressure, is generated as an inner pressure on the molten resin R filling the cavity 15 by an injection molding machine not shown in FIG. 20, and the molten resin R proceeds solidification while receiving the retention pressure.

This is to prevent recesses caused by shrinkage generated as the molten resin R filling the cavity 15 is cooled. Although the higher the mold temperature, the bigger the shrinkage in molding which causes the recesses, the present invention prevents the recesses by working of the retention pressure even in the resin injection hole 37 side of the mold 1 having high mold temperature.

According to the present invention, when the thickness of the product (wall thickness of the pipe) is t, and the length is L, the product of $L/t \geq 100$ can be molded with high accuracy. And, further thin and long body having the value of $L/t=300$ to 500 can be molded with high accuracy.

As an example of the long body, a resin pipe, of which outer diameter φ is 12 mm, inner diameter φ is 8 mm (outer diameter of the core member is 8 mm), and length is 326 mm ($L/t=163$), can be molded well with a difference in outer diameter does not exceed 0.05 mm, and the total deflection does not exceed 0.1 mm.

The product made by the above-described molding method for resin long body is, for example, a resin long body of cylindrical pipe or rod, molded by injection molding in which molten resin is injected to a mold. Cross-sectional side views of the mold for the product are shown in FIGS. 21 through 26, and a cross section of a principal portion is shown in FIG. 27. The molding method of the present invention (gate cutting method) is described below according to FIGS. 21 through 27.

Figure 21:
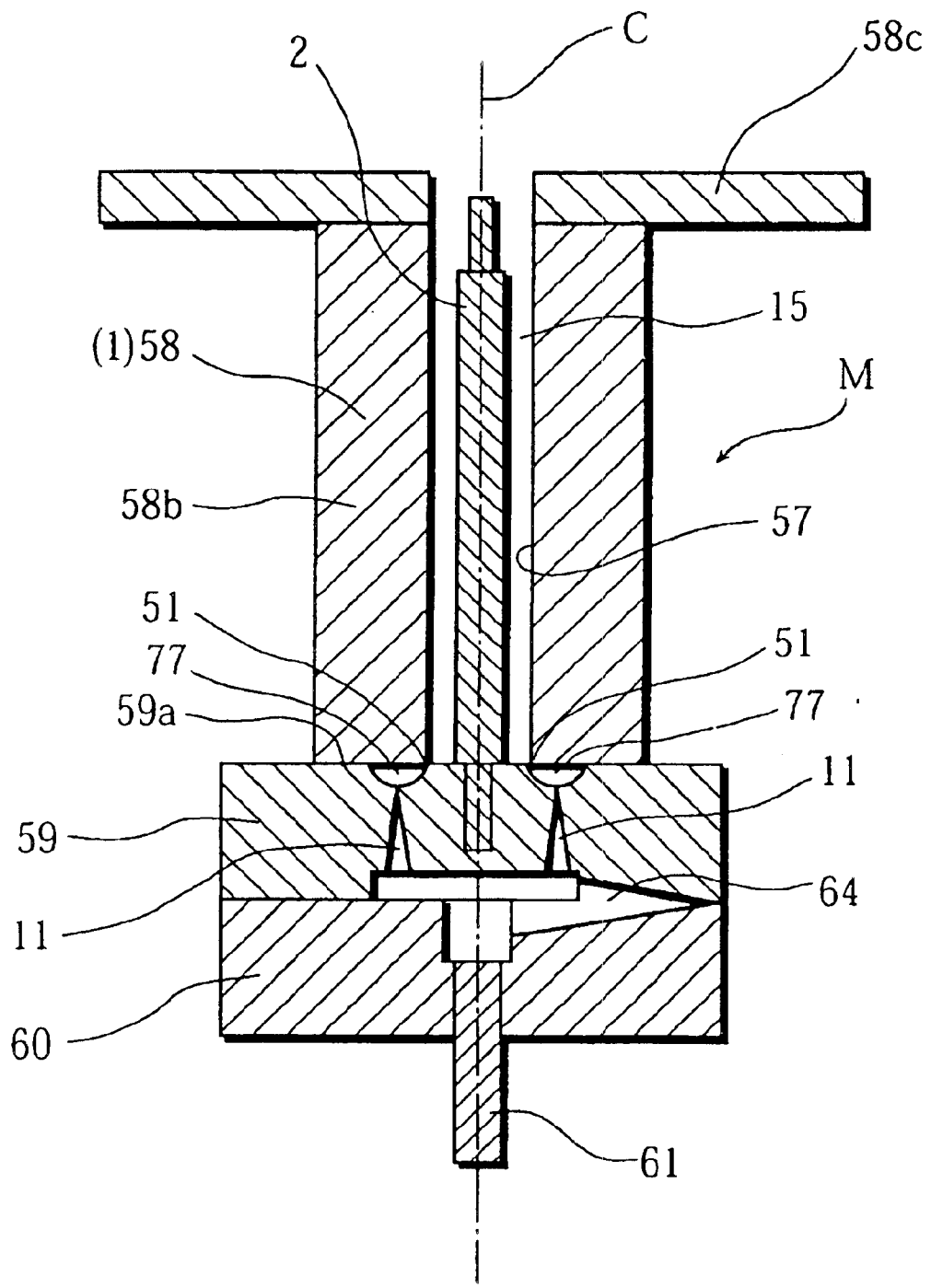
FIG. 21 is a cross-sectional side view showing an embodiment of a mold unit used in the molding method of the present invention.

As shown in FIG. 21, a mold unit M used for the molding method of the present invention is a split mold provided with a mold 1 (forming mold 58: a first mold), a second mold 59, a third mold 60, and a sprue protruding member 61. A molded product is molded in the cavity 15 surrounded by an inner peripheral wall 57 and a mating face 59a of the second mold 59. The mold 58 is a bored column, and provided with the shaft 2 made of metal, etc. in the central portion of the cavity 15 formed along the longitudinal direction of the mold 58. The shaft is inserted to a insertion hole on the second mold 59 and fixed as the axis corresponds to the axis of the mold 58 (the axis C of the mold unit M), And, the mold 58 has a main body portion 58b and a brim portion 58c connected to the mold 58 on an opposite side to the second mold 59.

Then, a cylindrical resin molded product is to be molded between the peripheral face of the shaft 2 and the inner peripheral wall (face) 57 of the mold 58. Or, as another embodiment, although not shown in Figures, the shaft 2 may be omitted to mold a solid cylinder is the cavity 15. Further, the cross-sectional configuration the cavity 15 is not only circular but rectangle.

A ring runner portion 77 is formed on the mating face (mating portion) 59a of the second mold 59 with the mold 58. The ring runner portion 77, as shown in the cross section of a principal portion of FIG. 27, forms a ring runner main body portion 78 and a gate portion 51 having a predetermined cross-sectional configuration serves as an injection hole to inject molten resin into the cavity 15. The gate portion 51 is communicatively connected to an end portion on the second mold 59 side on the inner peripheral wall 57 of the mold 58 (an end portion 52 of the inner peripheral wall) and serving as an injection hole of the ring runner portion 77 spreading outward around the second mold 59. That is to say, the gate 51 of the ring runner portion 77 is a ring-shaped injection hole opening along (and on) a cross line (imaginary) of the inner peripheral wall 57 of the mold 58 and the mating face 59a of the second mold 59 to form a resin passage having a space outward from the cross line.

Figure 31:
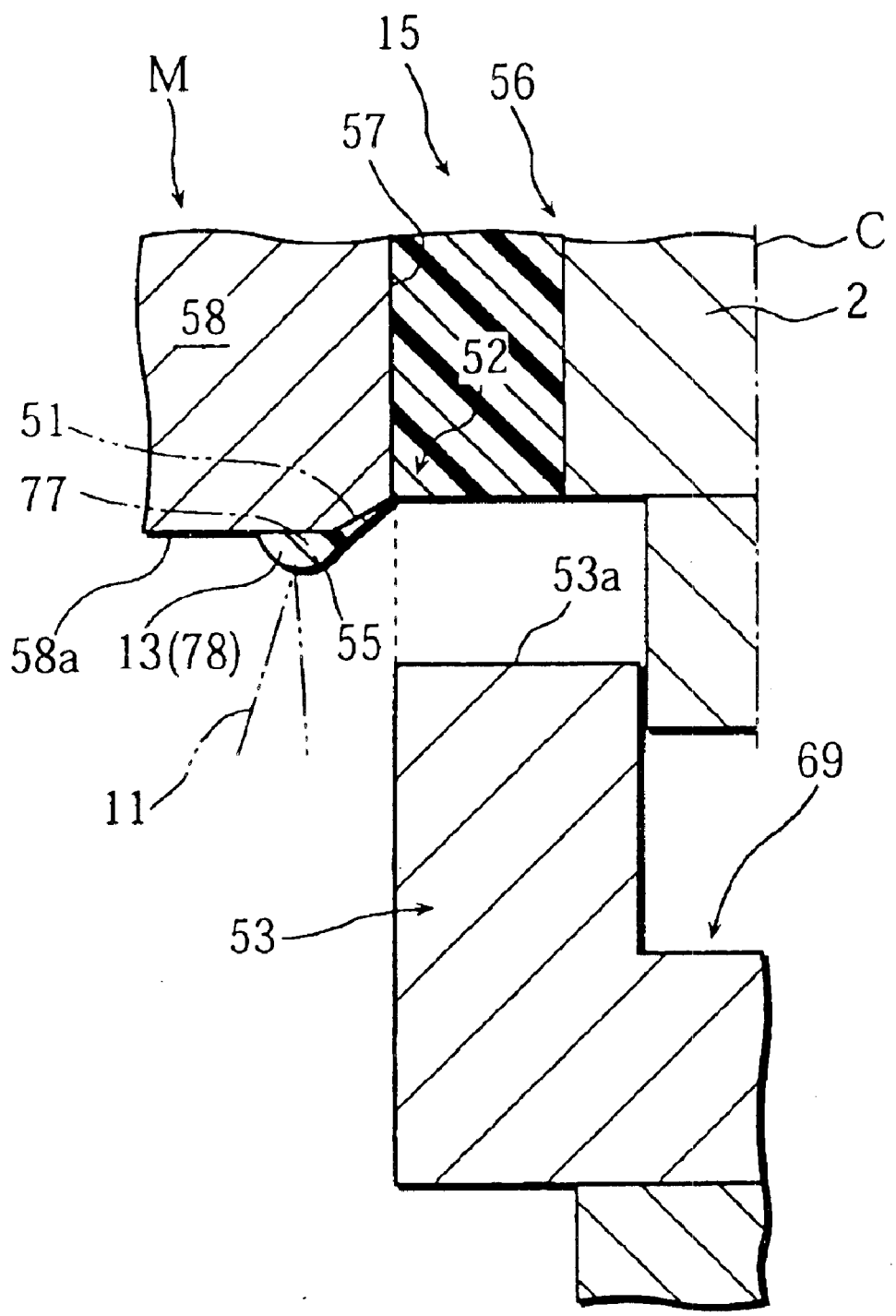
FIG. 31 is a cross-sectional view of a principal portion of the mold showing another embodiment.
Figure 32:
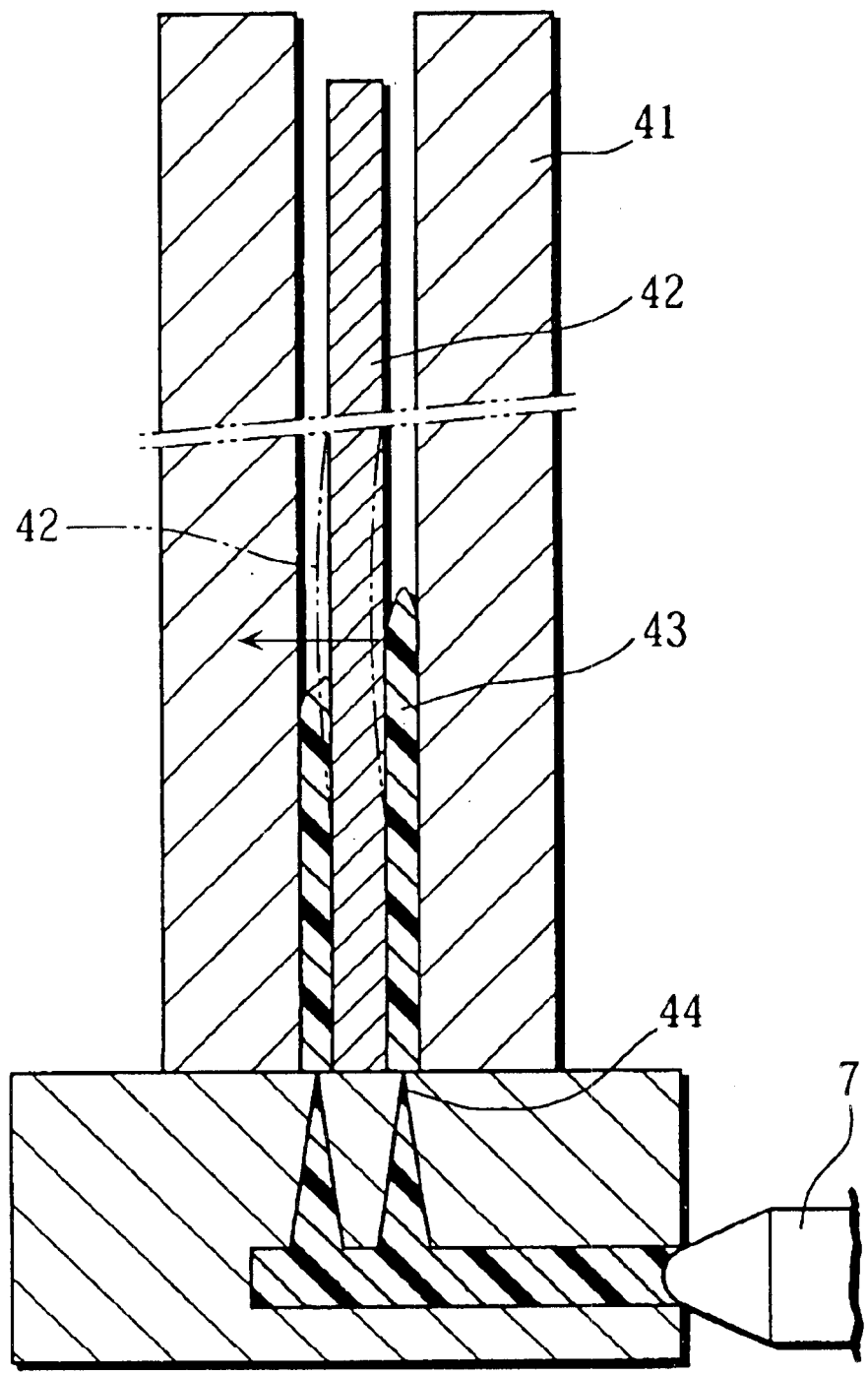
FIG. 32 is a cross-sectional side view of a molding apparatus showing a molding state in a conventional example.
Figure 33:
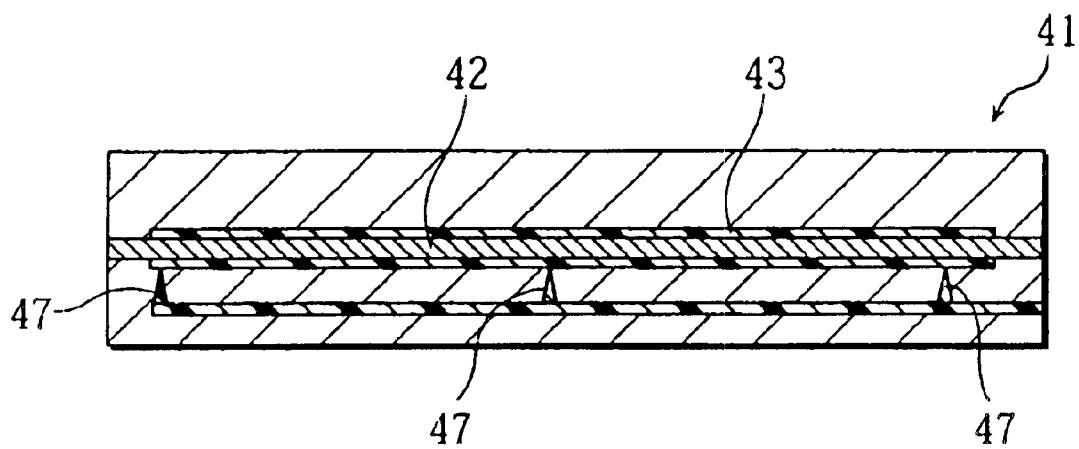
FIG. 33 is a cross-sectional side view for explanation of a conventional mold.
Figure 34:
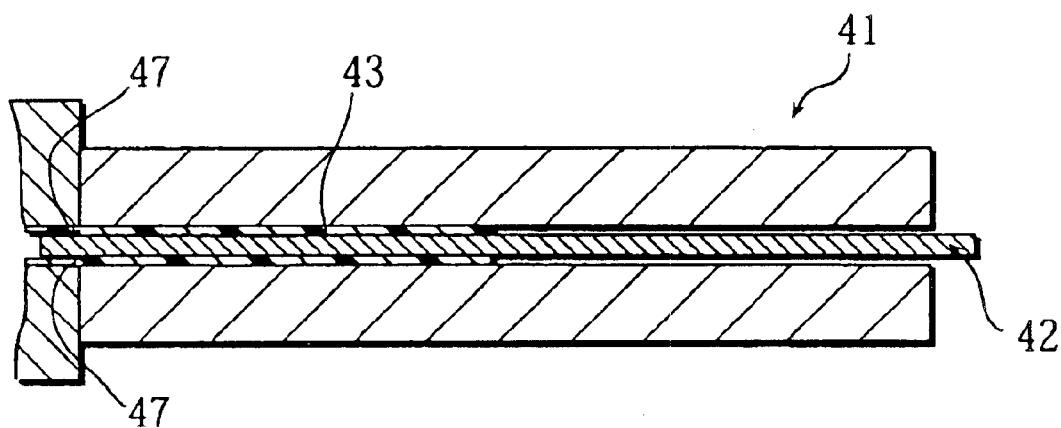
FIG. 34 is a cross-sectional side view for explanation of the conventional mold.
Figure 35:
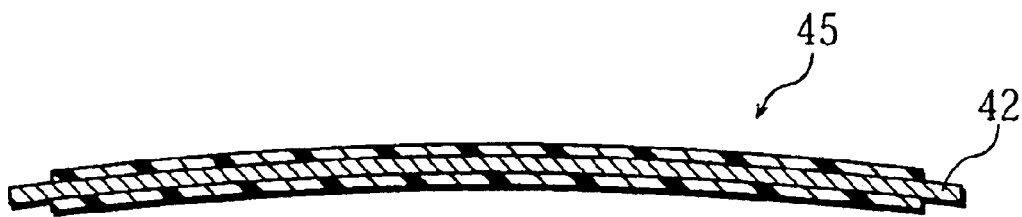
FIG. 35 is a cross-sectional side view of a long body made by a conventional molding method.
Figure 36:
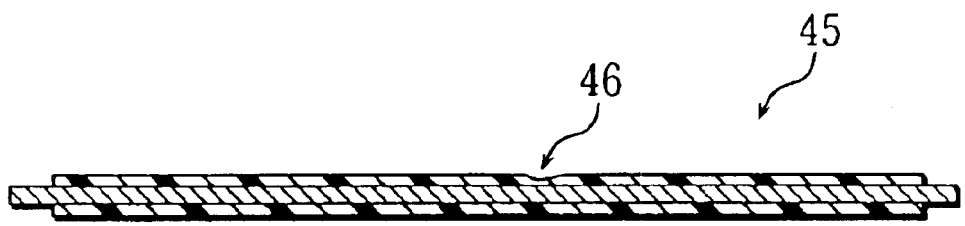
FIG. 36 is a cross-sectional side view of the long body made by the conventional molding method.
Figure 37:
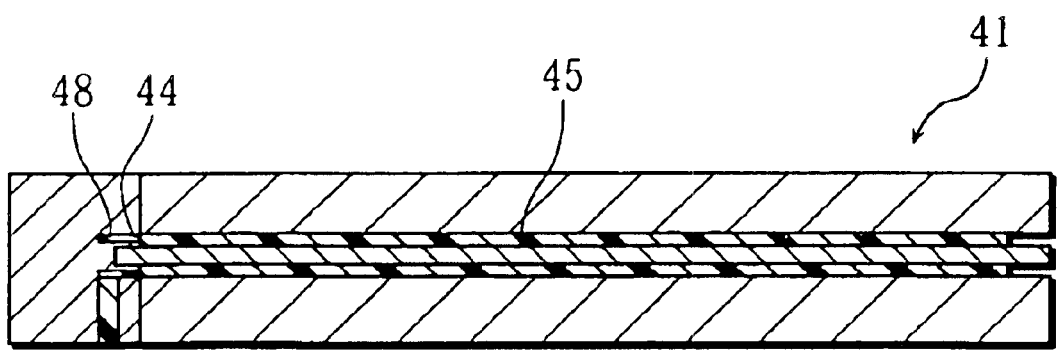
FIG. 37 is a cross-sectional side view of the conventional mold.

Therefore, the space in the ring runner portion 77 appears on the mating face 59a of the second mold 59 with the mold 58 when the mold 58 and the second mold 59 are divided in the mold unit M as a split mold. And, the ring runner portion 77, of which cross-sectional configuration in FIG. 27 is an approximately half circle formed by the plane mating face 58a of the mold 58, is a ring of which center is the axis C of the mold unit M. The gate portion 51 (gate 4) of the ring runner portion 77 may be the film gate 14 (fan gate) of thin ring in FIG. 1, or belleville-spring shaped communicatively connected to the resin well (resin well vacant chamber) 13 on the upstream side as shown in FIG. 31 (described later).

A sprue 64 as a passage for the molten resin is formed on a mating face of the second mold 59 and the third mold 60, and pin runners 11 are formed to sent the molten resin to the gate portion 51 through the spool 64.

Figure 22:
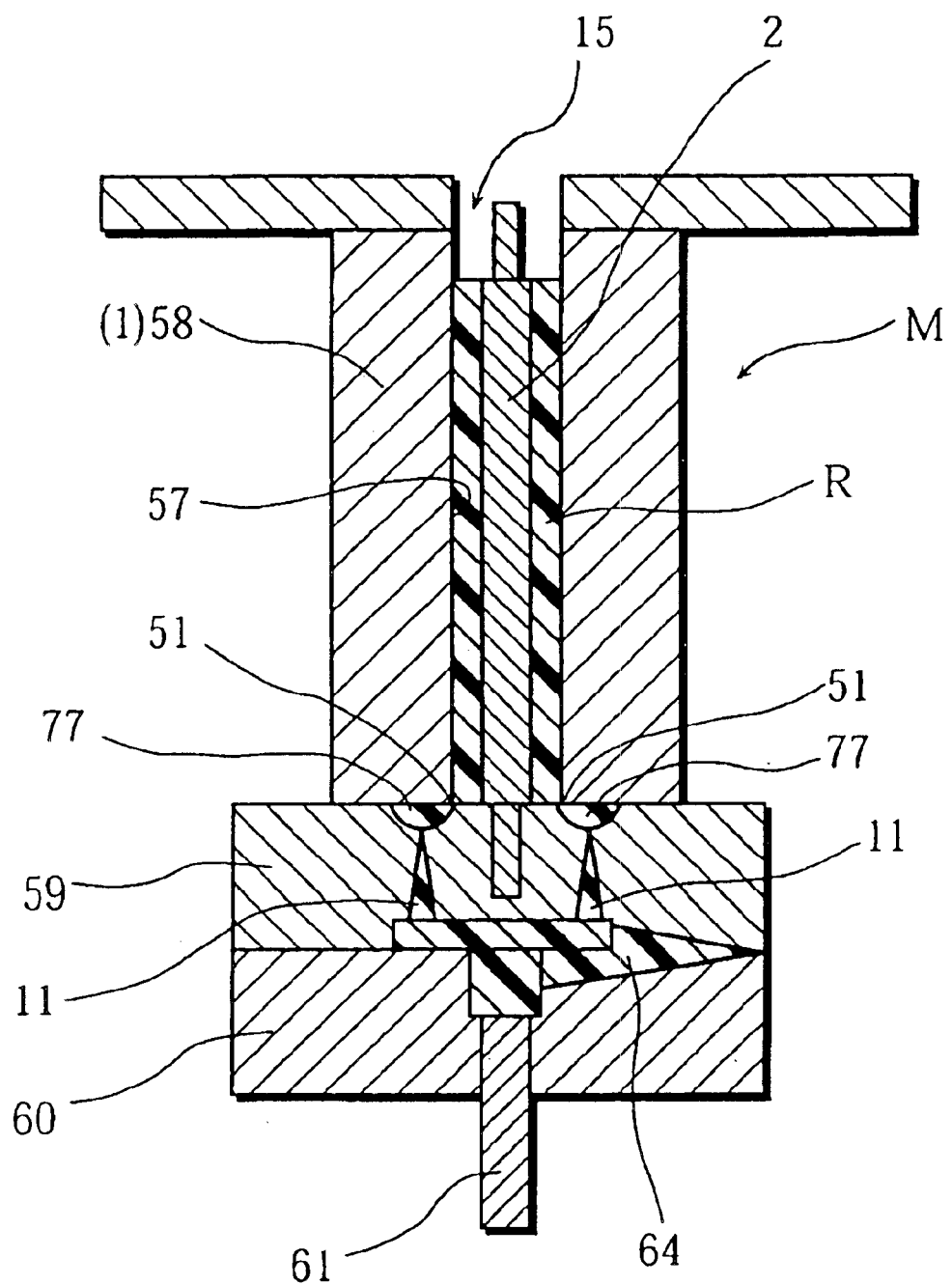
FIG. 22 is a cross-sectional side view of the mold unit showing a molding state.

And, as shown in FIG. 22, the molten resin R is injected into the cavity 15 by an injection molding machine not shown in FIG. 22 through the sprue 64, the pin runners 11, and the ring runner portion 77 (the gate portion 51). The cavity 15 of the mold 58 is filled with the molten resin R, and the molten resin R solidifies to become a molded product (injection molding process).

Figure 23:
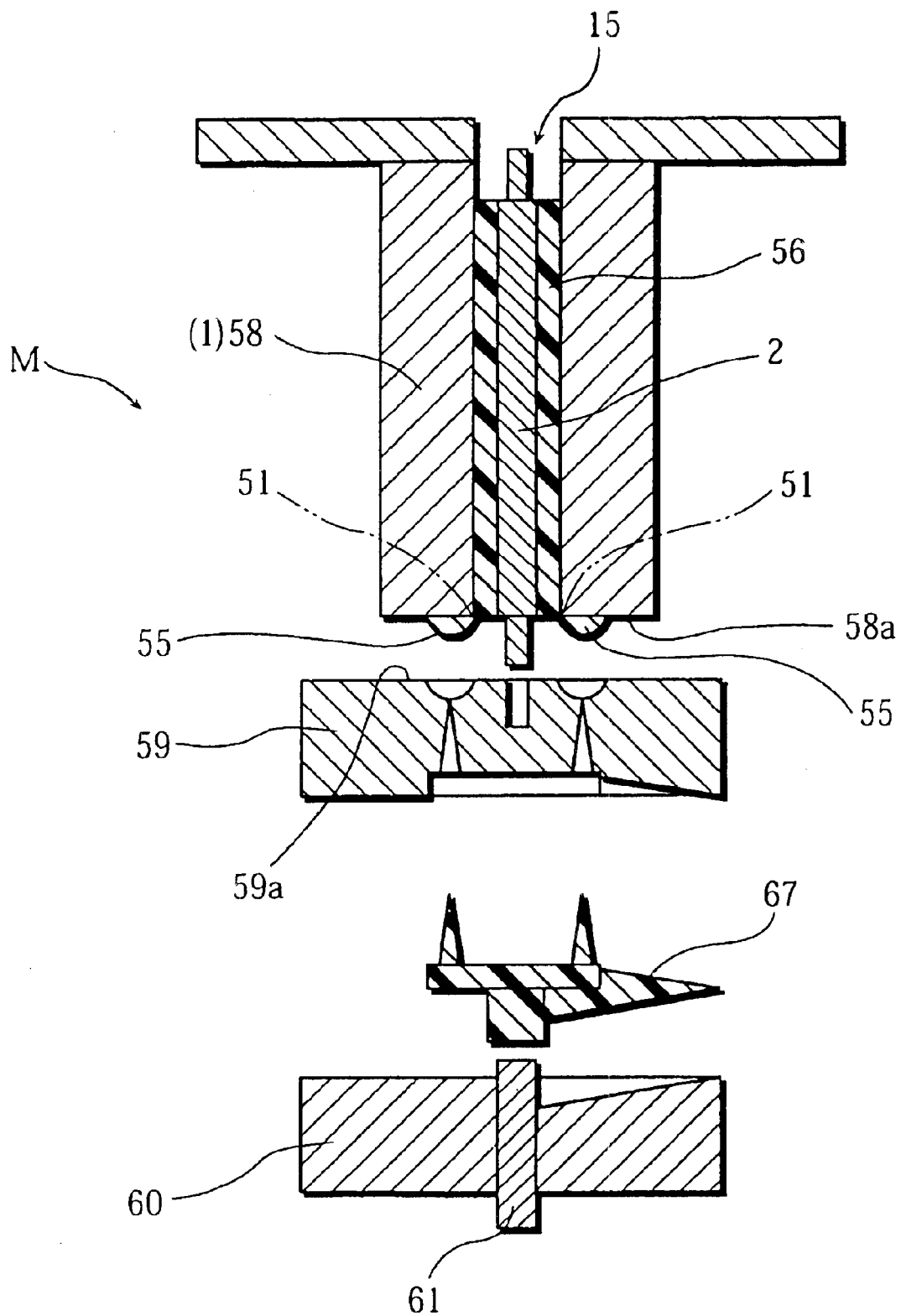
FIG. 23 is a cross-sectional side view of the mold unit for explanation of mold parting process.
Figure 25:
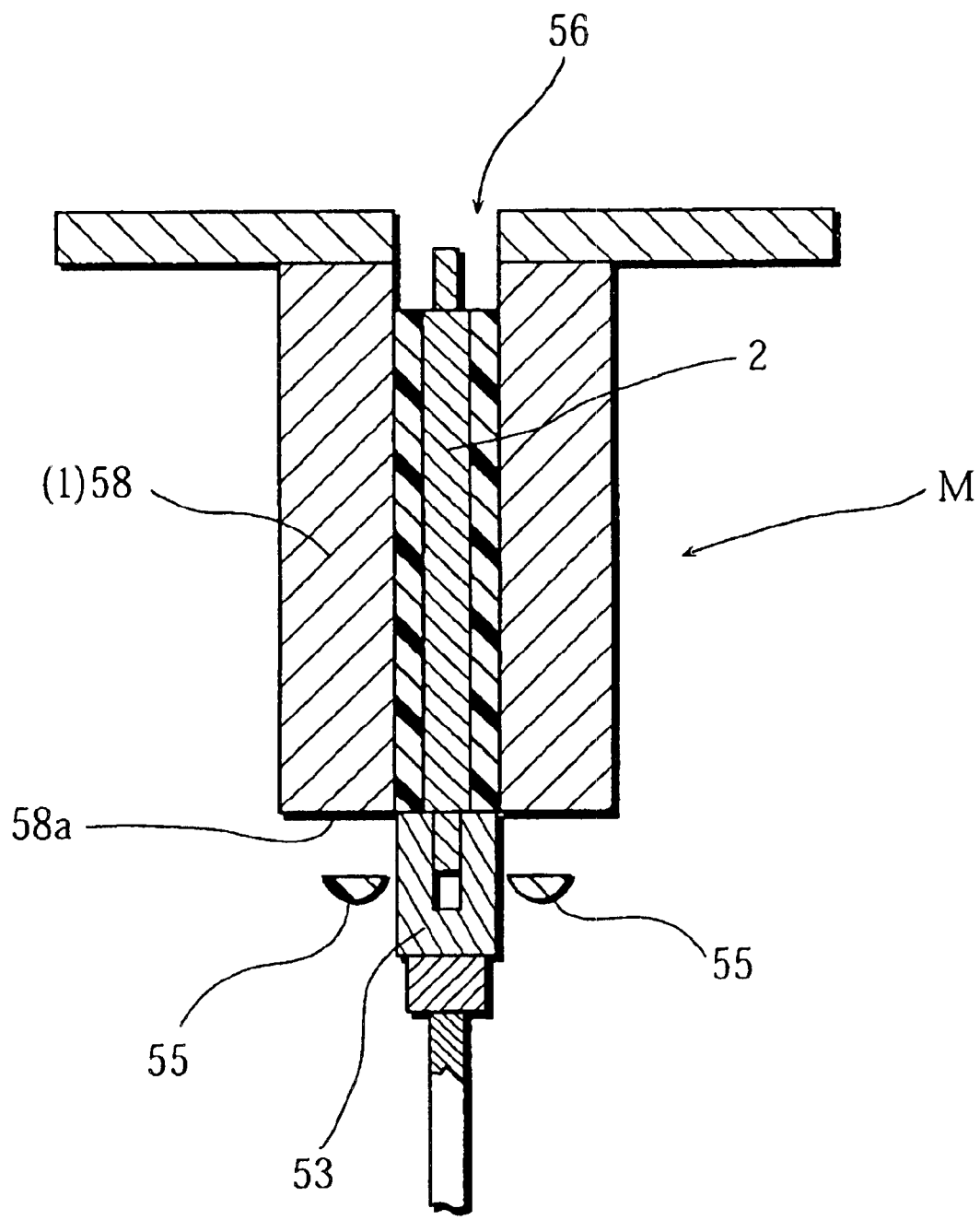
FIG. 25 is a cross-sectional side view of the mold for explanation of gate cutting process.

Next, as shown in FIG. 23, after the injection molding process, the molded product 56 remains on the mold 58 when the mold 58, the second mold 59, and the third mold 60 of the mold unit M are separated one another. Further, the ring runner 55, formed of resin solidified in the ring runner portion 77, is separated (cut) from the resin body 67 of the sprue portion by the separation movement of the mold unit M and connected to the peripheral end of the molded product 56 as to contact the mating face 58a of the mold 58. Therefore, the ring runner 55 is exposed on the mating face 58a of the mold 58. In this case, the shaft 2, drawn from the insertion hole of the second hole 59, remains in the mold 58 with the molded product 56.

The resin body 67 of the sprue portion, formed by the sprue 64 between the second mold 59 and the third mold 60, can be easily separated from the mold unit M and removed by pushing movement of the sprue protruding member 61 on the third mold 60 (mold separation process).

And, the molded product 56 to which the ring runner 55 is connected fits to the mold 58, and the ring runner 55 is cut in this state. (gate cutting process). To describe concretely, as shown in cross sections of a principal portion of FIG. 24 and FIG. 29, a punch member 53 corresponding to the configuration of the inner peripheral face 57 of the mold 58 approaches along the axis C of the mold 58 on the mating face 58a side of the mold 58 with the second mold 59. And, as shown in cross sections of a principal portion of FIG. 25 and FIG. 30, the punch member 53 contacts a downstream end portion 55a (an end portion of the gate portion 51 opening on the cavity 15) connecting the ring runner 55 to the molded product 56, and the ring runner 55 is sheared by cooperation of the inner peripheral wall 51 of the mold 58 (the end portion 52 of the inner peripheral wall) and the punch member 53 (gate cutting process).

Further, it is preferable to arrange the peripheral configuration of the punch member 53 (a contact portion with the ring runner 55) to be approximately similar but slightly smaller configuration to the cross-sectional configuration (dimension) in the axis direction of the inner peripheral wall 57 of the mold 58. That is to say, the ring runner 55 of the molded product 56 is certainly and clearly cut by small clearance between the punch member 53 and the inner peripheral wall 57, and secondary working of the molded product 56 is unnecessary. In other words, the ring runner 55 is cut by the mold 58 and the punch member 53 in dies-and-punch manner.

Figure 30:
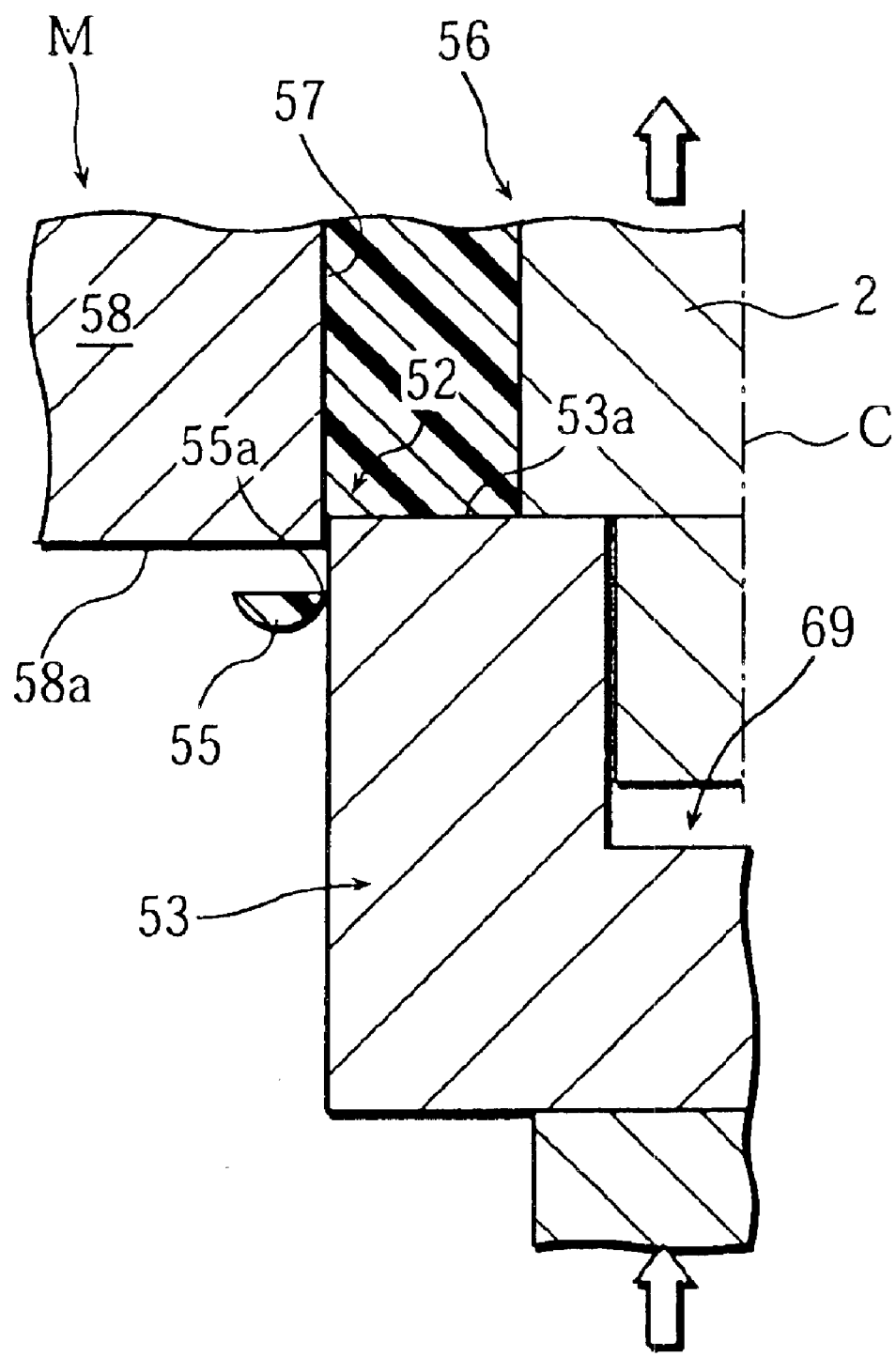
FIG. 30 is a cross-sectional view of a principal portion of the mold for explanation of gate cutting process.

In this case, as shown in FIG. 30, the molded product 56 slightly slides on the inner peripheral wall 57 of the mold 58 simultaneously with cutting the ring runner 55 by the contact and push of the punch member 53 because the molded product 56 has regular cross-sectional configurations in the longitudinal direction (the axis direction). The ring runner is certainly cut thereby.

And, as another embodiment, the ring runner portion 77 may have the gate portion 51 as shown in a cross section of a principal portion of FIG. 31. The gate portion 51, for injecting the molten resin sent from the pin runner 11 into the cavity 15 after regulating the injection pressure of the resin in the peripheral direction through the resin well 13 (the ring runner main body 78), may have a configuration having an slope as diminishes in diameter on the downstream side (the cavity 15 side) toward the axis C. And, the ring runner portion 77 having this gate configuration has to be connected to the end portion 52 of the inner peripheral wall of the mold 58.

Figure 26:
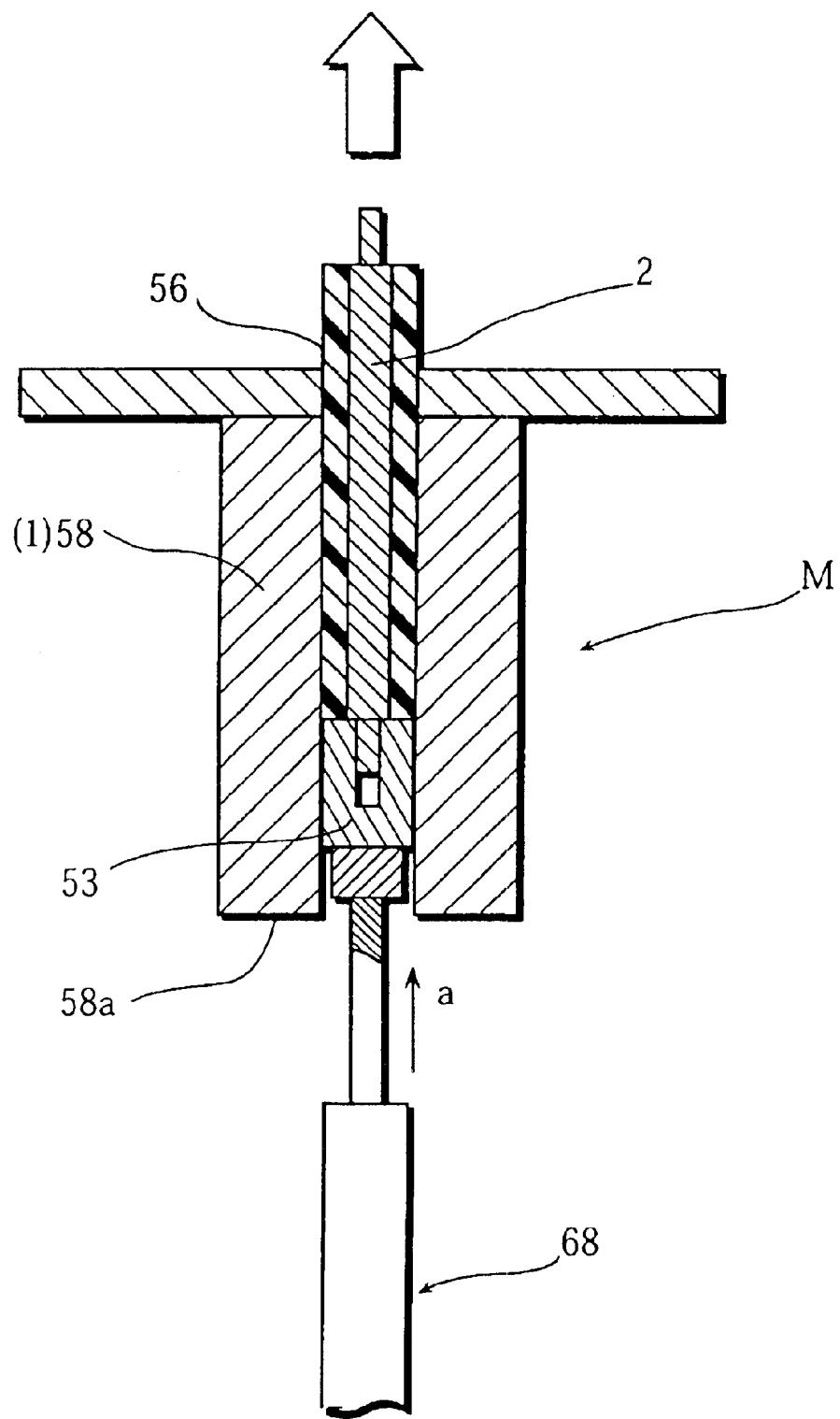
FIG. 26 is a cross-sectional side view of the mold for explanation of takeout process of the molded product.
Figure 27:
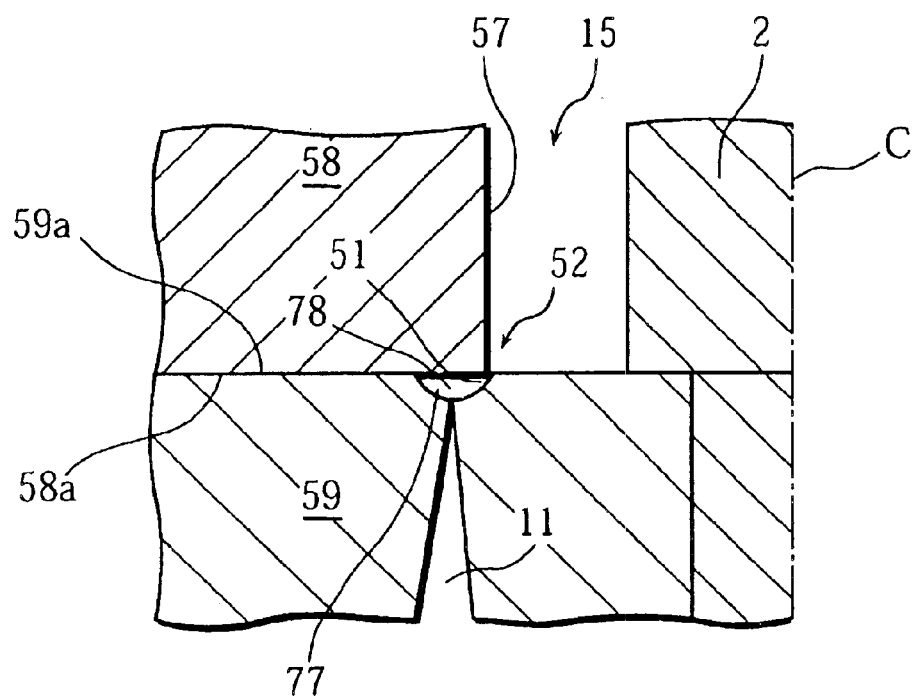
FIG. 27 is a cross-sectional view of a principal portion of the mold unit.

Further, the molded product 56 molded by the mold 58, having same cross-sectional configurations in the axis direction, after the gate cutting process with the punch member 53 and the mold 58, the punch member 53 successively moves in the axis direction to push the molded product 56 out of the mold 58 as shown in FIG. 26. That is to say, a back-and-forth driving means 68 is connected to an opposite side to the cutting portion of the punch member 53 to push out the molded product 56 by forth movement (shown with an arrow a) of the back-and-forth driving means 68 (takeout process of the molded product).

In this case, the shaft 2 is also taken out of the mold 58 together with the resin molded product 56. A fluid cylinder, a screw-driven extension device, etc. can be used as the back-and-forth driving means 68.

Figure 29:
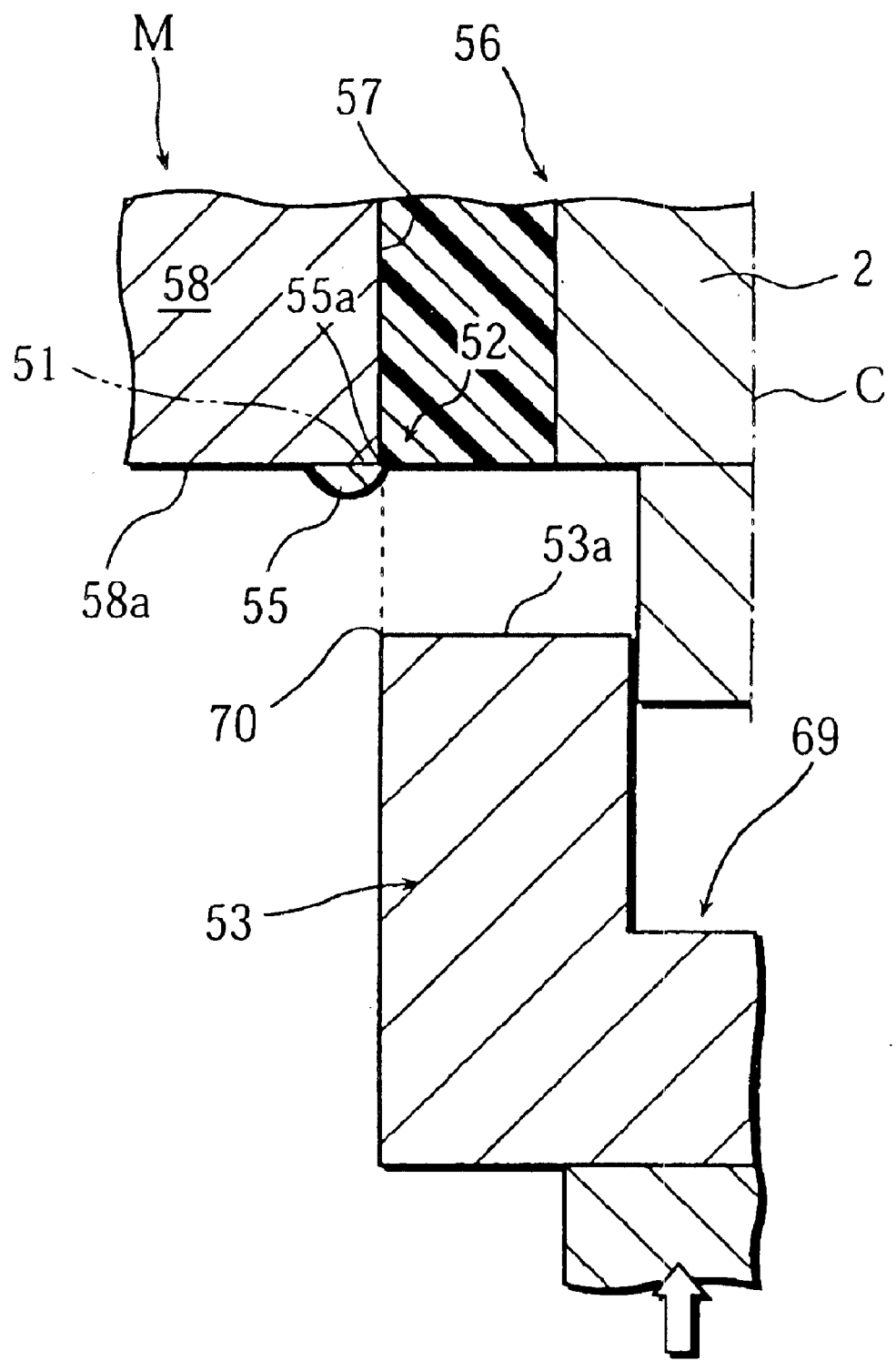
FIG. 29 is a cross-sectional view of a principal portion of the mold for explanation of gate cutting process.

To describe the configuration of the punch member 53 further in detail, as shown in FIG. 29, the peripheral face of the punch member 53 corresponds to the configuration of the inner peripheral wall 57 of the mold 58, and a forth end portion of the peripheral face of the punch member 53 serves as a blade portion 70 to actually cut the ring runner 55. However, the blade portion 70, which does not need to be protruding from the forth end face 53a of the punch member 53, may be on the same plane with the forth end face 53a. Therefore, whole area of the forth end face 53a contacts the end face of the molded product 56 and the staged portion (face) of the shaft 2 after the gate cutting, the molded product is not damaged by the pushing force, and pushed out stably and smoothly. Further, the punch member has a concave cross section having a concave pit 69 in the central portion. The concave pit 69 is provided as the forth end face 53a (the blade portion 70) of the punch member 53 firstly contacts the molded product 56 (the ring runner 55).

Figure 28:
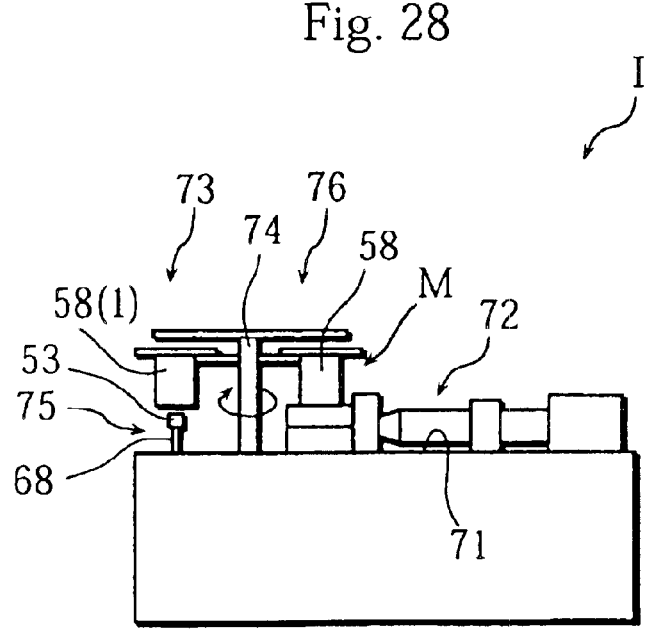
FIG. 28 is a side view of an injection molding machine.

Next, a side view of the injection molding machine I used for the molding method of the present invention is shown in FIG. 28. The injection molding machine I has an injection unit 72 of a base 71, the mold unit M to which molten resin is injected by the injection unit 72, a transfer means 74 rotating to transfer only the mold 58 of the mold unit M from an injection position 76 above the base 71 to a takeout position 73 of the molded product, and a molded product takeout means 75. The mold unit M has a construction as shown in FIG. 21 for easy transfer with a hitching piece utilizing the brim portion 58c of the mold 58.

That is to say, the above-mentioned injection molding is conducted on the injection position 76 (injection molding process), the above mold separation is conducted by transferring only the mold 58 in which the molded product 56 remains by the transfer means 74 (mold separation process), and the gate cutting and the takeout of the molded product are conducted with the molded product takeout means 75 provided with the punch member 53 and the back-and-forth driving means 68 (gate cutting process, molded product takeout process). Then, the vacant mold 58, after the molded product 56 is taken out, is returned to the injection position 76 by the rotating transfer movement of the transfer means 74 to continue the injection molding.

According to the molding method for resin long body of the present invention, the flowing velocity distribution of the molten resin R in the spaced portion 3 can be made uniform on a position in every lateral cross section of the mold 1. And, even if the long body has a long and thin configuration, the dimensional accuracy of the molded product can be improved with a simple method for the pressure controlling function of the resin well 13.

And, the upper end face of the filled molten resin R is always horizontal, and the flowing velocity distribution of the molten resin R in the spaced portion 3 can be made uniform further on a position in every lateral cross section of the mold 1. And, even if the long body has a long and thin configuration, the dimensional accuracy of the molded product can be remarkably improved with a simple method for the pressure controlling function of the resin well 13.

And, the flowing velocity distribution of the molten resin R in the spaced portion 3 can be close to uniform on a position in every lateral cross section of the mold 1. And, even if the long body has a long and thin configuration, the dimensional accuracy of the molded product can be improved with a simple method and a molded product having a predetermined cross section can be obtained for the flowing speed controlling function of the piston 5.

And, potential energy of the self weight of the piston 5 can be added to the sliding resistance, the flowing velocity distribution of the molten resin R in the spaced portion 3 can be close to uniform further on a position in every lateral cross section of the mold 1. And, even if the long body has a long and thin configuration, the dimensional accuracy of the molded product can be remarkably improved with a simple method and a molded product having a predetermined cross section can be obtained for the flowing speed controlling function of the piston 5 enhanced further.

And, liquidity of the molten resin R is improved, the molten resin R can be filled until the forth end side of the mold 1 (the cavity 15), and defection such as recess is not generated on the surface of the molded product. Therefore, a thin long body can be molded and the dimensional accuracy of the long body is made extremely high.

And, with setting the predetermined temperature of the mold 1, the molding becomes appropriate for the injected resin, and further accurate long body can be molded.

And, even if the temperature of the early filling portion 23 of the mold 1 is high, defection such as recess is not generated on the whole surface of the molded product, and further accurate long body can be molded.

Further, the ring runner 55 continuing to the molded product 56 molded by the mold 58 is swiftly and clearly cut by the mold 58 used as a die and the forward movement of the punch member 53 with simple construction. And, productivity of the injection molding is highly improved because the ring runner 55 can be easily cut without taking the resin molded product 56 out of the mold 58.

And, the productivity can be improved further because the takeout of the molded product 56 is also easily conducted with the punch member 53 for gate cutting.

According to the molding apparatus for resin long body of the present invention, the flowing velocity distribution of the molten resin R in the spaced portion 3 can be made uniform on a position in every lateral cross section of the mold 1. And, even if the long body has a long and thin configuration, the dimensional accuracy of the molded product can be improved with a simple method for the resin well 13 having the pressure controlling function of the molten resin R.

And, the flowing velocity distribution of the molten resin R in the spaced portion 3 can be close to uniform on a position in each of the lateral cross sections of the mold 1. And, even if the long body has a long and thin configuration, a molded product having an accurate predetermined cross section can be obtained for the piston 5 having the flowing speed controlling function of the molten resin R.

And, the flowing velocity distribution of the molten resin R in the spaced portion 3 can be close to uniform further on a position in each of the lateral cross sections of the mold 1. And, even if the long body has a long and thin configuration, a molded product having an accurate predetermined cross section can be obtained for the piston 5 having the flowing speed controlling function of the molten resin R and the resin well 13 having the pressure controlling function of the molten resin R.

And, the flowing velocity distribution of the molten resin R in the spaced portion 3 can be close to uniform on a position in each of the lateral cross sections of the mold 1. And, even if the long body has a long and thin configuration, the dimensional accuracy of the molded product can be improved with a simple method and an accurate hollow molded product (having a predetermined cross section) can be obtained for the piston 5 having the flowing speed controlling function of the molten resin R. And, the hole of the ring-shaped piston 5 regulates the core of the shaft 2 to obtain further accurate molded product.

And, the flowing velocity distribution of the molten resin R in the spaced portion 3 can be close to uniform further on a position in each of the lateral cross sections of the mold 1. And, even if the long body has a long and thin configuration, the dimensional accuracy of the molded product can be remarkably improved with a simple method and an accurate hollow molded product (having a predetermined cross section) can be obtained for the piston 5 having the flowing speed controlling function of the molten resin R and the resin well 13 having the pressure controlling function of the molten resin R. And, the hole of the ring-shaped piston 5 regulates the core of the shaft 2 to obtain further accurate molded product.

And, the flowing speed controlling function of the piston 5 can be enhanced because the piston 5 is prevented from protruding for the injection pressure of the molten resin R and the sliding resistance W of the piston 5 is easily changed. Therefore, the apparatus can easily correspond to changes in the injection pressure of the molten resin R when the injection molding is conducted, the filling speed, the size and length of the molded product.

And, an extremely strong and accurate long pipe of compound material can be made with a simple construction.

And. the sliding resistance W of the piston 5 can be high and changeable, the piston 5 is prevented from protruding for the injection pressure of the molten resin R, and it is easy to give slidability to the piston 5, resisting the injection temperature and pressure, as not to damage the mold 1 and the shaft 2.

And, the potential energy of the self weight of the piston 5 can be added to the sliding resistance W, and the flowing velocity distribution of the molten resin R supplied to the mold 1 in the spaced portion 3 can be uniform on a position in each of the lateral cross sections of the mold 1 because the upper end face of the filled molten resin R is always horizontal. Therefore, the dimensional accuracy of the molded product can be improved with a simple construction.

Further, liquidity of the molten resin R is improved, the molten resin R can be filled until the forth end side of the mold 1 (the cavity 15), and deflection such as recess is not generated on the surface of the molded product. Therefore, a thin long body can be molded and the dimensional accuracy of the long body is made extremely high.

And, with setting the predetermined temperature of the mold 1, the molding becomes appropriate for the injected resin, and further accurate long body can be molded.

While preferred embodiments of the present invention have been described in this specification, it is to be understood that the invention is illustrative and not restrictive, because various changes are possible within the spirit and indispensable features.

What is claimed is:

1. A method for molding a resin long body, comprising the steps of:
   supplying molten resin to a cavity disposed at a first portion of a mold, said supplying comprising:
   first flowing said molten resin from a plurality of passageways defined by a plurality of pin runners to an enlarged hollow ring defining a resin well, wherein each of said plurality of pin runners tapers to a point in the downstream direction, and said resin well is disposed downstream of said plurality of pin runners disposed at a second portion of said mold;
   second flowing said molten resin from said resin well, through a thin film gate to said cavity, said thin film gate is disposed downstream of said resin well, and is in communication with said cavity and said resin well.

2. The method of claim 1, wherein said molten resin flows from said thin film gate into said cavity, at a uniform pressure.

3. The method of claim 1, said step of second flowing comprising: flowing said molten resin through said thin film gate to a piston slidably disposed in an internal upstream end of said cavity, such that said molten resin is in communication with said piston upon flowing from said thin film gate to said cavity, and displaces said piston in said cavity downstream in an axis direction of said cavity, upon filling of said cavity with said molten resin.

4. The method for molding a resin long body of any one of claims 1 or 3, said cavity is vertically disposed in a longitudinal direction.

5. The method for molding a resin long body of any one of claims 1 or 3, said cavity is horizontally disposed in a latitudinal direction.

6. The method of any one of claims 1 or 3, said step of supplying further comprising:
   third flowing said molten resin from a resin injection hole disposed at upstream side of said cavity to said cavity, wherein said first portion of said mold comprises at least two different mold temperature zones from said injection hole to a distal end of said first portion of said mold, where an upstream mold temperature zone is at a higher temperature than a temperature of a subsequent downstream mold temperature zone.

7. The method of claim 6,
   wherein said first portion of said mold comprises an upstream temperature zone having an upstream mold temperature and a downstream temperature zone having a downstream mold temperature, wherein said upstream mold temperature is higher than said downstream mold temperature, and
   wherein said upstream mold temperature is at about a melting point of said resin, said injection hole is at said upstream mold temperature, and said downstream mold temperature is sufficiently lower than said melting point.

8. The method of claim 6, said step of injecting comprising injecting said molten resin with a retention pressure from said injection hole after said cavity is filled with molten resin.

9. The method of claim 7, said step of injecting comprising injecting said molten resin with a retention pressure from said injection hole after said cavity is filled with molten resin.

10. The method of any one of claims 2 or 3, further comprising:
    cooling said molten resin in said mold to form a cooled resin body.

11. The method of claim 10, wherein said cooled resin in said thin film gate and in said resin well together define a resin ring runner.

12. The method of claim 11, said mold comprising a second mold portion comprising a ring runner portion in which said resin ring runner is molded and a first mold portion comprising said cavity in which a product is molded, said second mold portion is removably connected to said first mold portion such that said resin ring runner connected to said molded product can be exposed upon separation of said first mold portion form said second mold portion.

13. The method of claim 12, further comprising:
    separating said second mold portion from said first mold portion to expose said resin ring runner formed with said ring runner portion; and
    removing said resin ring runner, from said cooled resin body contained in said first mold portion, comprising:
    contacting said resin ring runner with a punch member configured to mate with a peripheral internal wall of said first mold portion such that said resin ring runner is sheared from said cooled resin body, to form said resin long body in said first mold portion.

14. The method of claim 13, said resin long body comprises a substantially uniform diameter throughout its length, and said step of removing further comprising:
    after said contacting, second separating said resin long body from said first mold portion comprising advancing said punch member in an axis direction of said resin long body sufficient to push said resin long body out of said first mold portion, to produce said resin long body.

15. The method of any one of claims 2 or 3, said enlarged hollow ring comprises a top face, and an inner face disposed perpendicular to said top face, and said thin film gate comprises a first end in communication with said resin well and a second end in communication with said cavity.

16. The method of claim 15, said first end of said thin film gate is in communication with a top annular edge of said inner face of said enlarged hollow ring, and is disposed perpendicular to the axis of said mold.

17. The method of claim 15, said first end of said thin film gate is in communication with an inner annular edge of said top face of said enlarged hollow ring, and is disposed parallel to the axis of said mold.

18. The method of claim 2, said thin film gate comprises an annular opening in a top surface of said enlarged hollow ring, wherein said annular opening is disposed at an inner annular edge of said top surface, and is in communication with said cavity.

19. The method of any one of claims 1, 2 or 3, wherein said resin long body comprises a length to wall thickness ratio of $\geq 100$.

20. The method of claim 19, wherein said resin long body comprises a length to wall thickness ratio of 300 to 500.

21. The method of any one of claims 1, 2 or 3, wherein said pin runners are offset relative to said thin film gate.

* * * * *